(12) United States Patent
Miyasaka et al.

(10) Patent No.: US 11,472,069 B2
(45) Date of Patent: Oct. 18, 2022

(54) ULTRAVIOLET IRRADIATION DEVICE AND METHOD FOR CURING ULTRAVIOLET-CURING RESIN

(71) Applicant: NICHIA CORPORATION, Anan (JP)

(72) Inventors: Naohide Miyasaka, Suwa (JP); Yoshitaka Tanaka, Suwa (JP); Minoru Kitahara, Yoshino (JP)

(73) Assignee: NICHIA CORPORATION, Anan (JP)

( * ) Notice: Subject to any disclaimer, the term of this patent is extended or adjusted under 35 U.S.C. 154(b) by 163 days.

(21) Appl. No.: 16/587,056

(22) Filed: Sep. 30, 2019

(65) Prior Publication Data

US 2020/0101644 A1    Apr. 2, 2020

(30) Foreign Application Priority Data

Oct. 2, 2018 (JP) ............................. JP2018-187694
Mar. 26, 2019 (JP) ............................. JP2019-058216

(51) Int. Cl.
| | | |
|---|---|---|
| *A61L 2/10* | (2006.01) | |
| *H05B 45/18* | (2020.01) | |
| *B29C 35/08* | (2006.01) | |
| *F21V 29/503* | (2015.01) | |
| *F21V 29/54* | (2015.01) | |
| *F21V 23/00* | (2015.01) | |
| *H05B 45/14* | (2020.01) | |
| *H05B 45/325* | (2020.01) | |
| *F21Y 115/10* | (2016.01) | |

(52) U.S. Cl.
CPC ........ *B29C 35/0805* (2013.01); *F21V 23/003* (2013.01); *F21V 29/503* (2015.01); *F21V 29/54* (2015.01); *H05B 45/14* (2020.01); *H05B 45/18* (2020.01); *H05B 45/325* (2020.01); *B29C 2035/0827* (2013.01); *F21Y 2115/10* (2016.08)

(58) Field of Classification Search
CPC ......... B29C 35/0805; B29C 2035/0827; F21V 29/54; F21V 23/003; F21V 29/503; H05B 45/14; H05B 45/18; H05B 45/325; A61L 2/08; A61L 2/10; A61L 2/24
See application file for complete search history.

(56) References Cited

U.S. PATENT DOCUMENTS

| | | | | |
|---|---|---|---|---|
| 2007/0276455 | A1* | 11/2007 | Fiset .................... | A61N 5/0617 607/91 |
| 2009/0016390 | A1* | 1/2009 | Sumiyama ................ | G01J 1/08 372/29.01 |
| 2010/0014867 | A1 | 1/2010 | Ramanitra et al. | |

(Continued)

FOREIGN PATENT DOCUMENTS

| | | |
|---|---|---|
| JP | 49-102663 U | 12/1974 |
| JP | 02-082659 | 3/1990 |

(Continued)

*Primary Examiner* — Thai Pham
(74) *Attorney, Agent, or Firm* — Mori & Ward, LLP

(57) ABSTRACT

An ultraviolet irradiation device includes a light-emitting element, a temperature control element, and a control circuit. The light-emitting element is configured to emit an ultraviolet light. The temperature control element is configured to control a temperature of the light-emitting element. The control circuit is configured to control the temperature control element based on a voltage of the light-emitting element so as to control a peak wavelength of the ultraviolet light.

14 Claims, 16 Drawing Sheets

(56) References Cited

U.S. PATENT DOCUMENTS

| | | | | |
|---|---|---|---|---|
| 2013/0141013 A1* | 6/2013 | Kodama | ................ | H01L 24/97 |
| | | | | 315/294 |
| 2015/0264772 A1* | 9/2015 | Iwahashi | ................ | H05B 45/28 |
| | | | | 315/312 |
| 2019/0200424 A1* | 6/2019 | Mochizuki | ............ | H05B 45/56 |

FOREIGN PATENT DOCUMENTS

| | | |
|---|---|---|
| JP | 2008-545230 | 12/2008 |
| JP | 2009-042302 | 2/2009 |
| JP | 2011-077551 | 4/2011 |
| JP | 2016-039362 | 3/2016 |
| JP | 2016-189262 | 11/2016 |
| JP | 2017-090388 | 5/2017 |

* cited by examiner

ULTRAVIOLET IRRADIATION DEVICE AND METHOD FOR CURING ULTRAVIOLET-CURING RESIN

CROSS-REFERENCE TO RELATED APPLICATIONS

This application is based upon and claims the benefit of priority from Japanese Patent Application No. 2018-187694, filed on Oct. 2, 2018, and Japanese Patent Application No. 2019-058216, filed on Mar. 26, 2019; the entire contents of which are incorporated herein by references.

BACKGROUND OF THE INVENTION

Field

Embodiments relate to an ultraviolet irradiation device and a method for curing ultraviolet-curing resin.

Discussion of the Background

An ultraviolet-curing resin that is cured by irradiating an ultraviolet ray is used when manufacturing an integrated circuit device, etc. It is desirable to cure the ultraviolet-curing resin quickly and efficiently using low electrical power.

SUMMARY

An ultraviolet irradiation device according to an embodiment includes a light-emitting element, a temperature control element, and a control circuit. The light-emitting element is configured to emit an ultraviolet light. The temperature control element is configured to control a temperature of the light-emitting element. The control circuit is configured to control the temperature control element based on a voltage of the light-emitting element so as to control a peak wavelength of the ultraviolet light.

An ultraviolet irradiation device according to an embodiment includes light-emitting elements, a temperature control element, and a control circuit. The light-emitting elements are configured to emit ultraviolet lights having respective peak wavelengths. The respective peak wavelengths are different from each other. The temperature control element is configured to control temperatures of the light-emitting elements. The control circuit is configured to control the temperature control element to control one of the light-emitting elements to emit one of the ultraviolet lights and to control a peak wavelength of the one of the ultraviolet lights.

A method for curing an ultraviolet-curing resin according to an embodiment includes acquiring a target peak wavelength of an ultraviolet light suited to curing an ultraviolet-curing resin. A relationship between a temperature of a light-emitting element and a peak wavelength of an ultraviolet light to be emitted by the light-emitting element is acquired. A temperature control element provided on the light-emitting element is controlled based on the relationship to control the temperature of the light-emitting element such that the peak wavelength of the ultraviolet light to be emitted by the light-emitting element approaches the target peak wavelength. A constant current pulse having a pulse width of 10 milliseconds or less is applied to the light-emitting element.

A method for curing an ultraviolet-curing resin according to an embodiment includes acquiring a target peak wavelength and target radiant flux of an ultraviolet light suited to curing an ultraviolet-curing resin. A first relationship between a temperature of a light-emitting element and a peak wavelength of an ultraviolet light to be emitted by the light-emitting element is acquired. A second relationship between radiant flux of the ultraviolet light and a current flowing in the light-emitting element is acquired. A temperature control element provided on the light-emitting element is controlled based on the first relationship to control the temperature of the light-emitting element such that the peak wavelength of the ultraviolet light to be emitted by the light-emitting element approaches the target peak wavelength. A current is applied to the light-emitting element based on the second relationship such that the radiant flux of the ultraviolet light approaches the target radiant flux.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DETAILED DESCRIPTION

Figure 1:
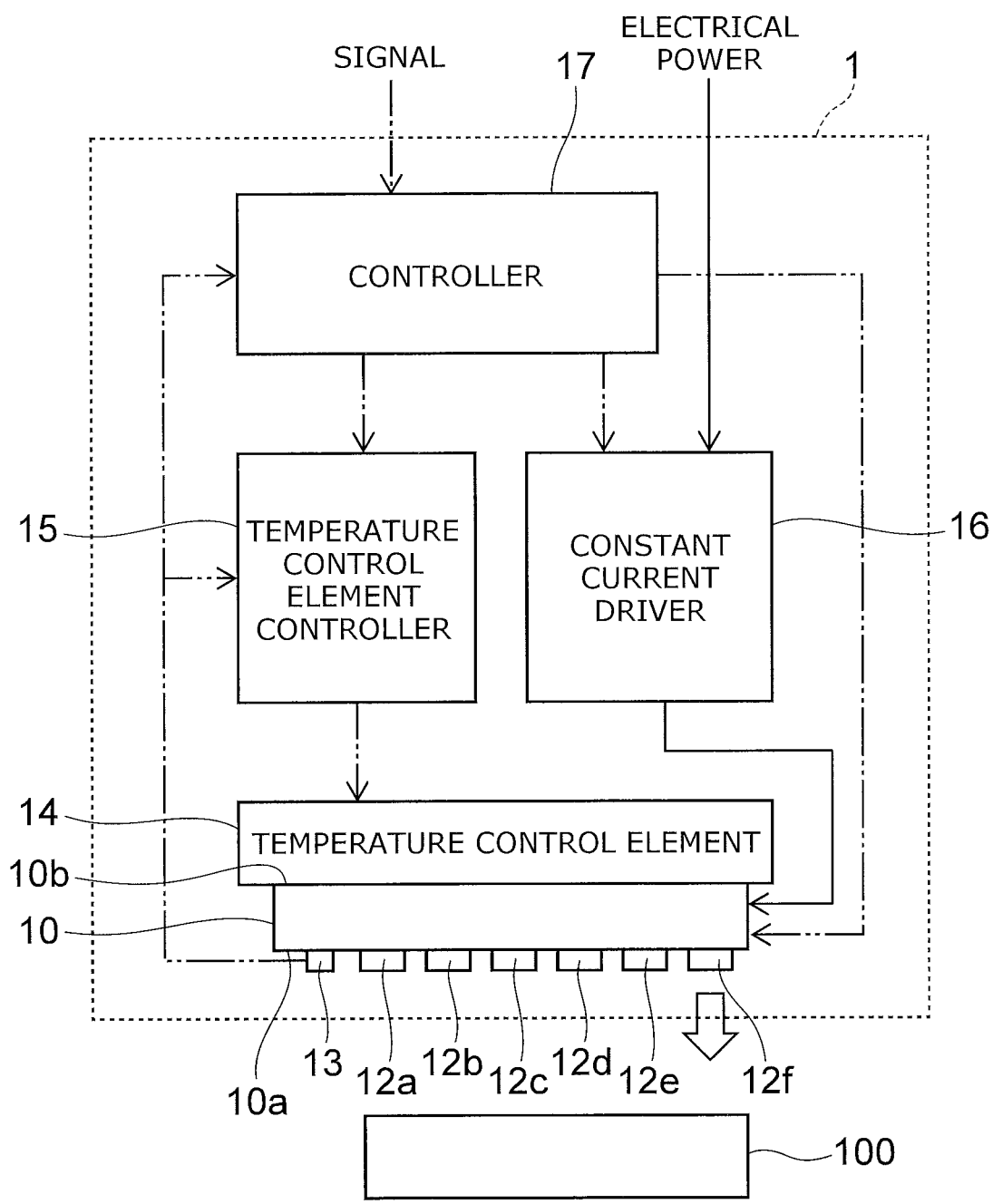
FIG. 1 is a block diagram showing an ultraviolet irradiation device according to a first embodiment.

The embodiments will now be described with reference to the accompanying drawings, wherein like reference numerals designate corresponding or identical elements throughout the various drawings.

First Embodiment

FIG. 1 is a block diagram showing an ultraviolet irradiation device according to the embodiment.

In FIG. 1, the solid-line arrows illustrate the flow of the drive current for causing the light-emitting element to emit light; and the double dot-dash-line arrows illustrate the flow of the signal current. This is similar for the other block diagrams described below as well.

As shown in FIG. 1, the ultraviolet irradiation device 1 according to the embodiment cures an ultraviolet-curing resin 100 by irradiating an ultraviolet ray (an ultraviolet light) on the ultraviolet-curing resin 100.

A mounting substrate 10 is provided in the ultraviolet irradiation device 1; and multiple, e.g., six light-emitting elements 12a to 12f (hereinbelow, also generally referred to as the "light-emitting element 12") are mounted to a front surface 10a of the mounting substrate 10. Also, a temperature detection element 13, a temperature control element 14, a temperature control element controller 15, a constant current driver 16, and a controller (or control circuit) 17 are provided in the ultraviolet irradiation device 1. Condensation countermeasures are taken for the ultraviolet irradiation device 1.

The light-emitting element 12 is an element configured to emit an ultraviolet ray and is, for example, an UVLED (Ultra Violet Light Emitting Diode). The peak wavelengths of the ultraviolet rays emitted by the light-emitting elements 12a to 12f are different from each other. For example, at room temperature (25° C.), the peak wavelength of the light-emitting element 12a is 367 nm (nanometers); the peak wavelength of the light-emitting element 12b is 374 nm; the peak wavelength of the light-emitting element 12c is 381 nm; the peak wavelength of the light-emitting element 12d is 388 nm; the peak wavelength of the light-emitting element 12e is 395 nm; and the peak wavelength of the light-emitting element 12f is 401 nm.

The temperature detection element 13 is mounted to the front surface 10a of the mounting substrate 10, detects a junction temperature Tj of the light-emitting element 12, and outputs the result to the temperature control element controller 15 and the controller 17.

The temperature control element 14 includes, for example, one or multiple Peltier elements and is thermally connected to a back surface 10b of the mounting substrate 10. The temperature control element 14 heats and cools the light-emitting element 12 via the mounting substrate 10.

The temperature control element controller 15 receives a control signal from the controller 17 and controls the temperature control element 14. The temperature control element controller 15 drives the temperature control element 14 to control the temperature of the light-emitting element 12 to be within the range of the specification temperature of the light-emitting element 12 and controls the junction temperature Tj of the light-emitting element 12 to be, for example, in the range of −10° C. to 150° C.

The constant current driver 16 receives the input of a direct current power from the outside and a control signal from the controller 17 and outputs a pulse current to the mounting substrate 10. The duration of one pulse of the pulse current is, for example, 10 ms (milliseconds) or less; and the duty ratio of the pulse current is, for example, 0.01 or less. For example, when the duration of one pulse is 10 ms, the duration of the interval between the pulses is 1 s (seconds) or more. By setting a current If supplied to the light-emitting element 12 to be a pulse current, the temperature increase of the light-emitting element 12 due to the conduction can be suppressed; and the shift of the peak wavelength of the light-emitting element 12 to the longer-wavelength side can be suppressed.

Information that relates to the type of the ultraviolet-curing resin 100 is input to the controller 17 from the outside; and the controller 17 stores, in internal memory, information relating to the wavelength of the ultraviolet ray that efficiently cures the ultraviolet-curing resin 100, information relating to the junction temperature Tj and the light-emitting element 12 suited to emitting the ultraviolet ray of the wavelength that efficiently cures the ultraviolet-curing resin 100.

Or, the information relating to the wavelength of the ultraviolet ray that efficiently cures the ultraviolet-curing resin 100 is input to the controller 17 from the outside; and the controller 17 stores, in internal memory, the information relating to the junction temperature Tj and the light-emitting element 12 suited to emitting the ultraviolet ray of the wavelength that efficiently cures the ultraviolet-curing resin 100.

Or, the information relating to the junction temperature Tj and the light-emitting element 12 suited to emitting the ultraviolet ray of the wavelength that efficiently cures the ultraviolet-curing resin 100 are input to the controller 17 from the outside.

The controller 17 sets the target temperature of the junction temperature Tj of the light-emitting element 12, and controls the temperature control element controller 15 based on the output signal from the temperature detection element 13. Also, the controller 17 outputs a select signal to the mounting substrate 10 to set one of the light-emitting elements 12a to 12f to the ON-state and the remaining light-emitting elements of the light-emitting elements 12a to 12f to the OFF-state. The controller 17 also outputs a pulse current to the constant current driver 16.

A method for curing the ultraviolet-curing resin according to the embodiment will now be described.

Figure 2:
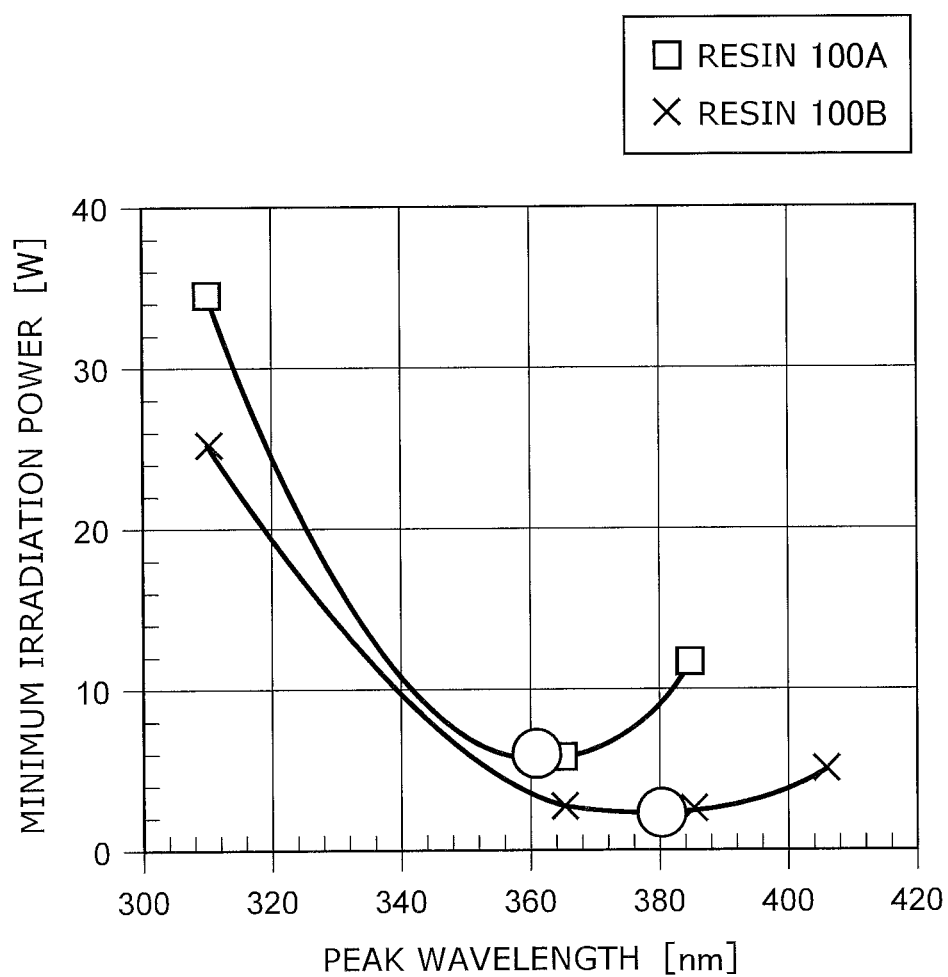
FIG. 2 is a graph showing curing characteristics of ultraviolet-curing resins, in which the horizontal axis is a peak wavelength of an ultraviolet ray, and the vertical axis is a minimum irradiation power of the ultraviolet ray necessary for curing a constant amount of the ultraviolet-curing resin.

FIG. 2 is a graph showing curing characteristics of ultraviolet-curing resins, in which the horizontal axis is the peak wavelength of the ultraviolet ray, and the vertical axis is the minimum irradiation power of the ultraviolet ray necessary for curing a constant amount of the ultraviolet-curing resin.

Figure 3A:
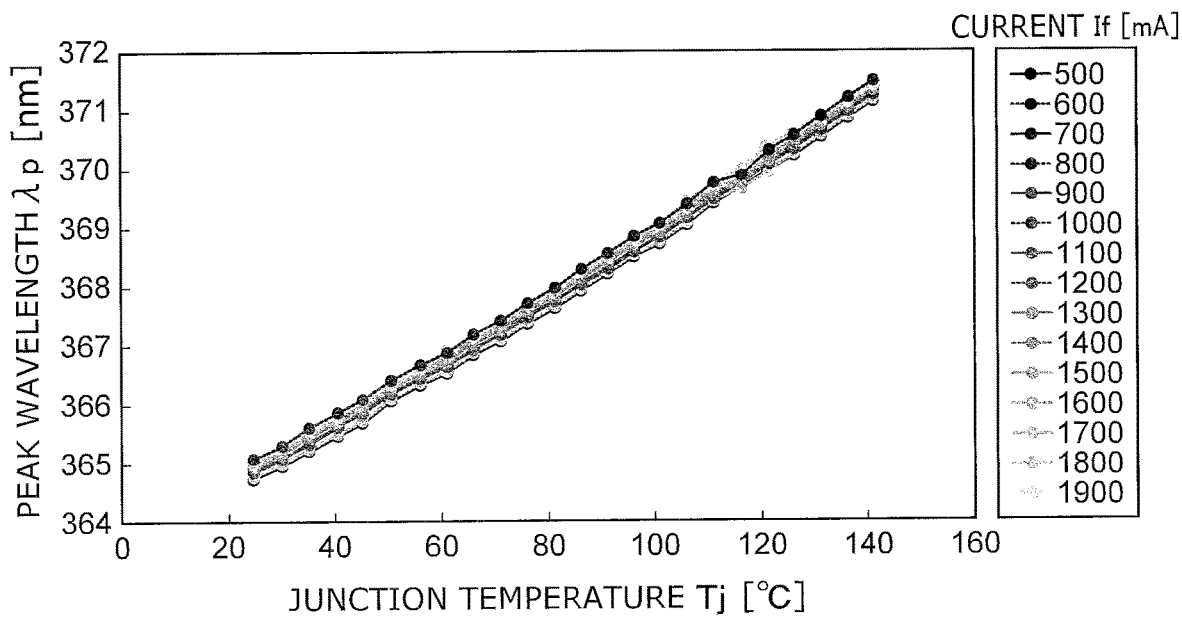
FIG. 3A and FIG. 3B are graphs showing temperature characteristics of light-emitting elements, in which the horizontal axis is a junction temperature Tj, and the vertical axis is a peak wavelength $\lambda p$ of an ultraviolet ray emitted by the light-emitting element.
Figure 3B:
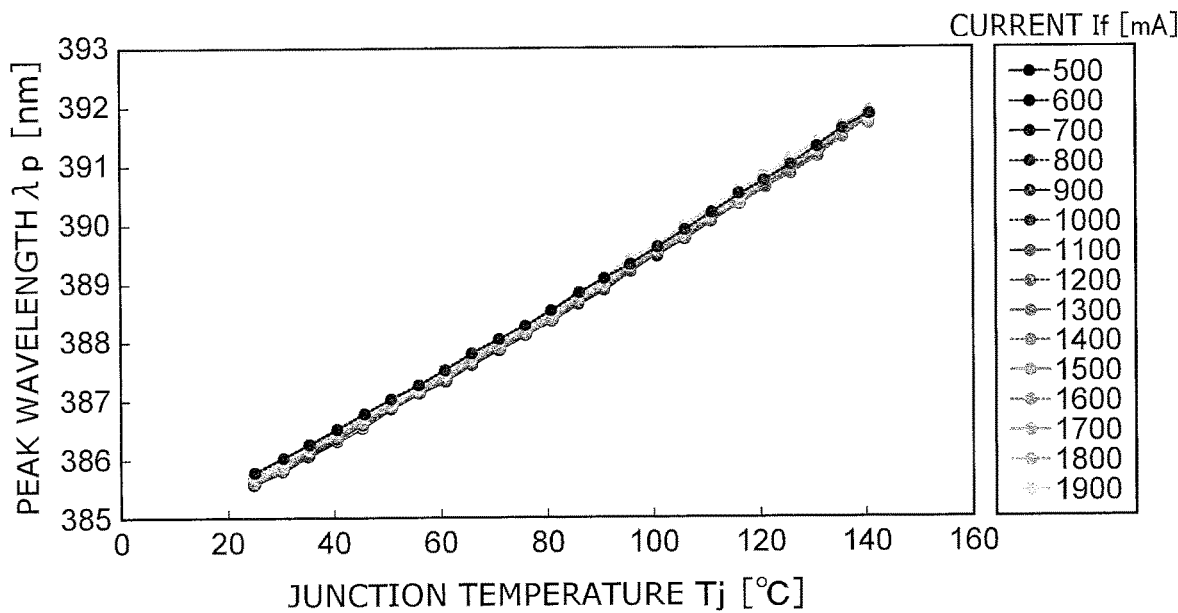

FIG. 3A and FIG. 3B are graphs showing the temperature characteristics of light-emitting elements, in which the horizontal axis is the junction temperature Tj, and the vertical axis is a peak wavelength $\lambda p$ of the ultraviolet ray emitted by the light-emitting element.

Figure 4:
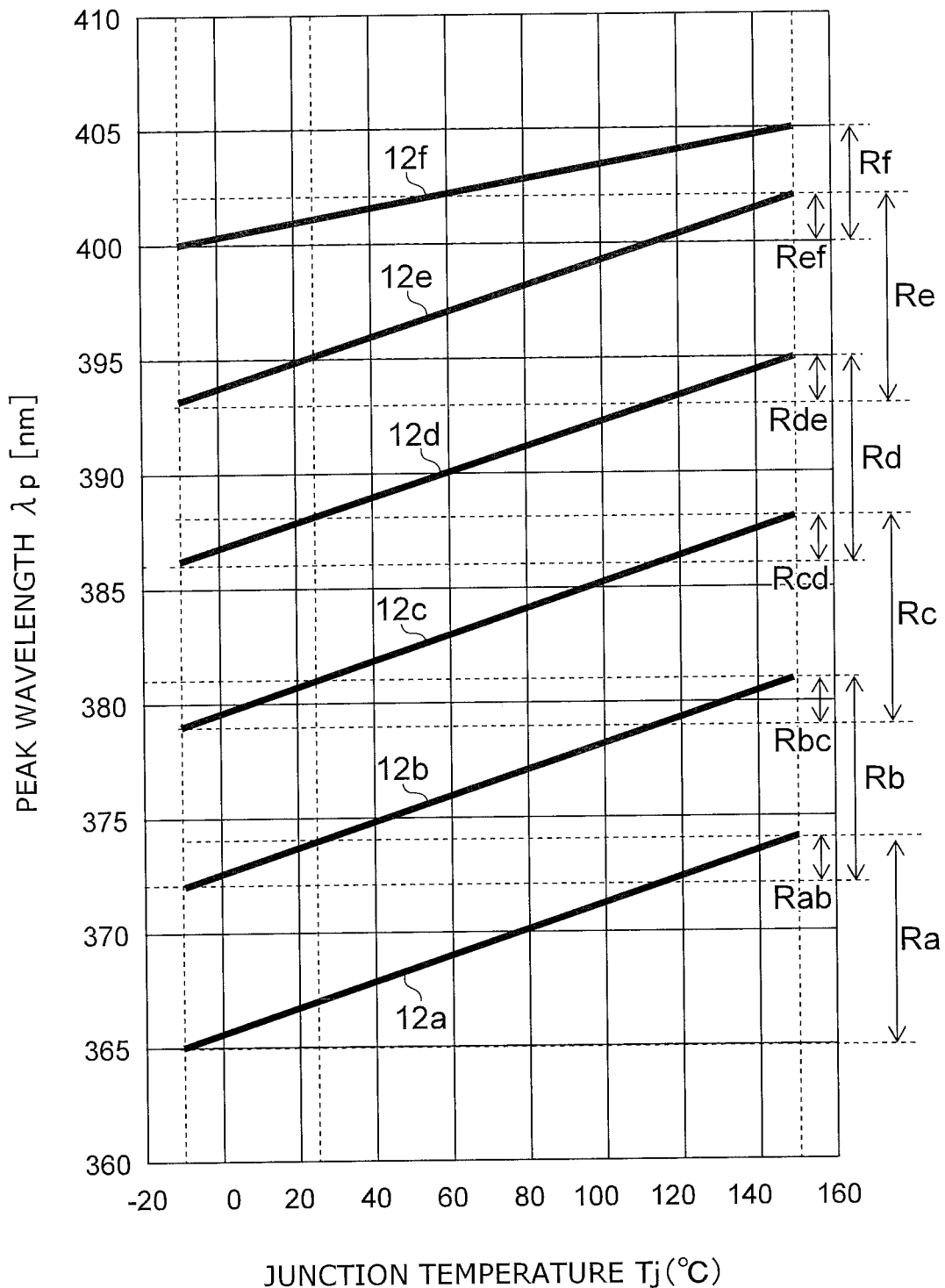
FIG. 4 is a graph showing the temperature characteristics of multiple light-emitting elements, in which the horizontal axis is the junction temperature Tj, and the vertical axis is the peak wavelength $\lambda p$ of the ultraviolet ray emitted by the light-emitting element.

FIG. 4 is a graph showing the temperature characteristics of multiple light-emitting elements, in which the horizontal axis is the junction temperature Tj, and the vertical axis is the peak wavelength λp of the ultraviolet ray emitted by the light-emitting element.

Although the ultraviolet-curing resin (hereinbelow, also called simply the "resin") is cured by irradiating an ultraviolet ray, the efficiency of the curing is dependent on the wavelength of the ultraviolet ray; and a wavelength exists at which the curing is performed at a minimum irradiation power. Hereinbelow, such a wavelength is called the "maximum-efficiency wavelength." The maximum-efficiency wavelength is different according to the type of resin.

In the example shown in FIG. 2, a resin 100A cures most efficiently when an ultraviolet ray having a peak wavelength of 360 nm is irradiated; and the efficiency of the curing decreases when the peak wavelength is longer or shorter than 360 nm. In other words, the maximum-efficiency wavelength of the resin 100A is 360 nm. On the other hand, a resin 100B cures most efficiently when an ultraviolet ray having a peak wavelength of 380 nm is irradiated; and the efficiency of the curing decreases when the peak wavelength is longer or shorter than 380 nm. In other words, the maximum-efficiency wavelength of the resin 100B is 380 nm.

In the embodiment, for example, preliminary experiments are performed; and the maximum-efficiency wavelength is determined for each type of ultraviolet-curing resin. The maximum-efficiency wavelength of each resin may be stored in the controller 17 or may be input from an external computer, etc.

FIG. 3A shows the temperature characteristics of a light-emitting element having a peak wavelength of 365 nm at room temperature (25° C.); and FIG. 3B shows the temperature characteristics of a light-emitting element having a peak wavelength of 385 nm at room temperature. As shown in FIG. 3A and FIG. 3B, the peak wavelength of the ultraviolet ray emitted by the light-emitting element 12 changes according to the junction temperature Tj of the light-emitting element 12; and the peak wavelength increases as the junction temperature Tj of the light-emitting element 12 increases. The relationship between the junction temperature Tj and the peak wavelength is substantially linear. Substantially no dependence of the peak wavelength on the current If flowing in the light-emitting element 12 is confirmed.

An example of the peak wavelength ranges of the light-emitting elements 12a to 12f will now be described with reference to FIG. 4.

For the light-emitting element 12a, the peak wavelength at room temperature (25° C.) is about 367 nm; but the peak wavelength at −10° C. is about 365 nm; and the peak wavelength at +150° C. is about 374 nm. In other words, the peak wavelength of the light-emitting element 12a can be selected within a range Ra of 365 to 374 nm. The width of the range Ra is about 9 nm.

For the light-emitting element 12b, the peak wavelength at room temperature is about 374 nm; but the peak wavelength at −10° C. is about 372 nm; and the peak wavelength at +150° C. is about 381 nm. In other words, the peak wavelength of the light-emitting element 12b can be selected within a range Rb of 372 to 381 nm. The width of the range Rb is about 9 nm. The peak range Ra of the light-emitting element 12a and the peak range Rb of the light-emitting element 12b overlap each other in a range Rab of 372 to 374 nm. The width of the range Rab is about 2 nm.

For the light-emitting element 12c, the peak wavelength at room temperature is about 381 nm; but the peak wavelength at −10° C. is about 379 nm; and the peak wavelength at +150° C. is about 388 nm. In other words, the peak wavelength of the light-emitting element 12c can be selected within a range Rc of 379 to 388 nm. The width of the range Rc is about 9 nm. The peak range Rb of the light-emitting element 12b and the peak range Rc of the light-emitting element 12c overlap each other in a range Rbc of 379 to 381 nm. The width of the range Rbc is about 2 nm.

For the light-emitting element 12d, the peak wavelength at room temperature is about 388 nm; but the peak wavelength at −10° C. is about 386 nm; and the peak wavelength at +150° C. is about 395 nm. In other words, the peak wavelength of the light-emitting element 12d can be selected within a range Rd of 386 to 395 nm. The width of the range Rd is about 9 nm. The peak range Rc of the light-emitting element 12c and the peak range Rd of the light-emitting element 12d overlap each other in a range Rcd of 386 to 388 nm. The width of the range Rcd is about 2 nm.

For the light-emitting element 12e, the peak wavelength at room temperature is about 395 nm; but the peak wavelength at −10° C. is about 393 nm; and the peak wavelength at +150° C. is about 402 nm. In other words, the peak wavelength of the light-emitting element 12e can be selected within a range Re of 395 to 402 nm. The width of the range Re is about 9 nm. The peak range Rd of the light-emitting element 12d and the peak range Re of the light-emitting element 12e overlap each other in a range Rde of 393 to 395 nm. The width of the range Rde is about 2 nm.

For the light-emitting element 12f, the peak wavelength at room temperature is about 401 nm; but the peak wavelength at −10° C. is about 400 nm; and the peak wavelength at +150° C. is about 405 nm. In other words, the peak wavelength of the light-emitting element 12f can be selected within a range Rf of 400 to 405 nm. The width of the range Rf is about 5 nm. The peak range Re of the light-emitting element 12e and the peak range Rf of the light-emitting element 12f overlap each other in a range Ref of 400 to 402 nm. The width of the range Ref is about 2 nm.

Thus, for example, each light-emitting element 12 has a control range of the peak wavelength having a width of about 9 nm or about 5 nm; parts of the control ranges of the light-emitting elements 12 overlap each other; and the width of the overlap range is about 2 nm. By using the six light-emitting elements 12a to 12f, a peak wavelength in the range of 365 to 405 nm can be selected.

The ranges of the peak wavelengths are not limited to the example described above; and wavelengths in a peak range can be selected by selecting the combination of the light-emitting elements 12. The number of the light-emitting elements 12 is not limited to 6 and may be 5 or less, or may be 7 or more. It is favorable for parts of the control ranges of the light-emitting elements 12 to overlap each other. Although the width of the overlap range is not limited to 2 nm, it is favorable for the width of the overlap range to be 5 nm or less.

For example, the relationship between the junction temperature Tj and the peak wavelength for each light-emitting element 12 such as those described above are pre-acquired by performing preliminary experiments. These relationships may be stored in the controller 17 in the format of formulas or tables; and relationships that are stored in an external computer, etc., may be utilized.

In the embodiment, the information that relates to the maximum-efficiency wavelength of each type of ultraviolet-curing resin and the information of the relationship between the junction temperature Tj and the peak wavelength for each light-emitting element 12 are stored in the internal memory inside the controller 17.

The operation of the ultraviolet irradiation device 1 will now be described.

Figure 5:
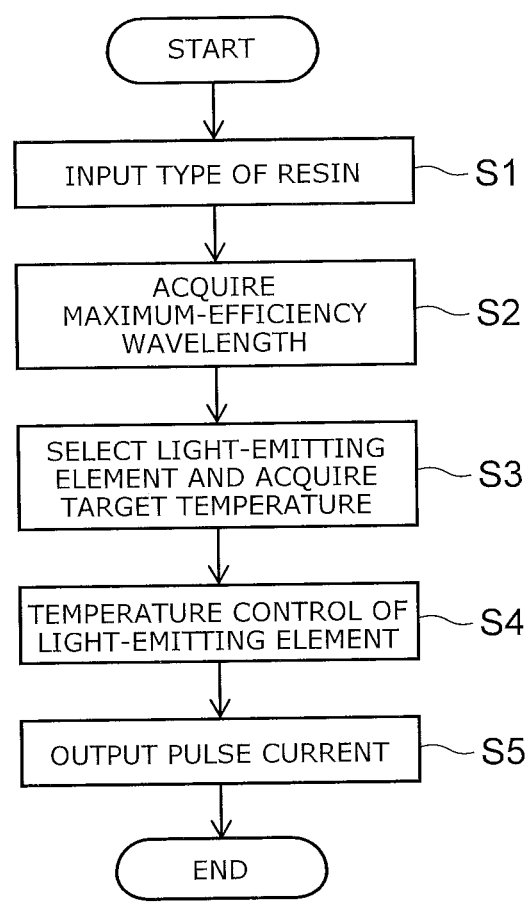
FIG. 5 is a flowchart showing an operation of the ultraviolet irradiation device according to the first embodiment.

FIG. 5 is a flowchart showing the operation of the ultraviolet irradiation device according to the embodiment.

Figure 6:
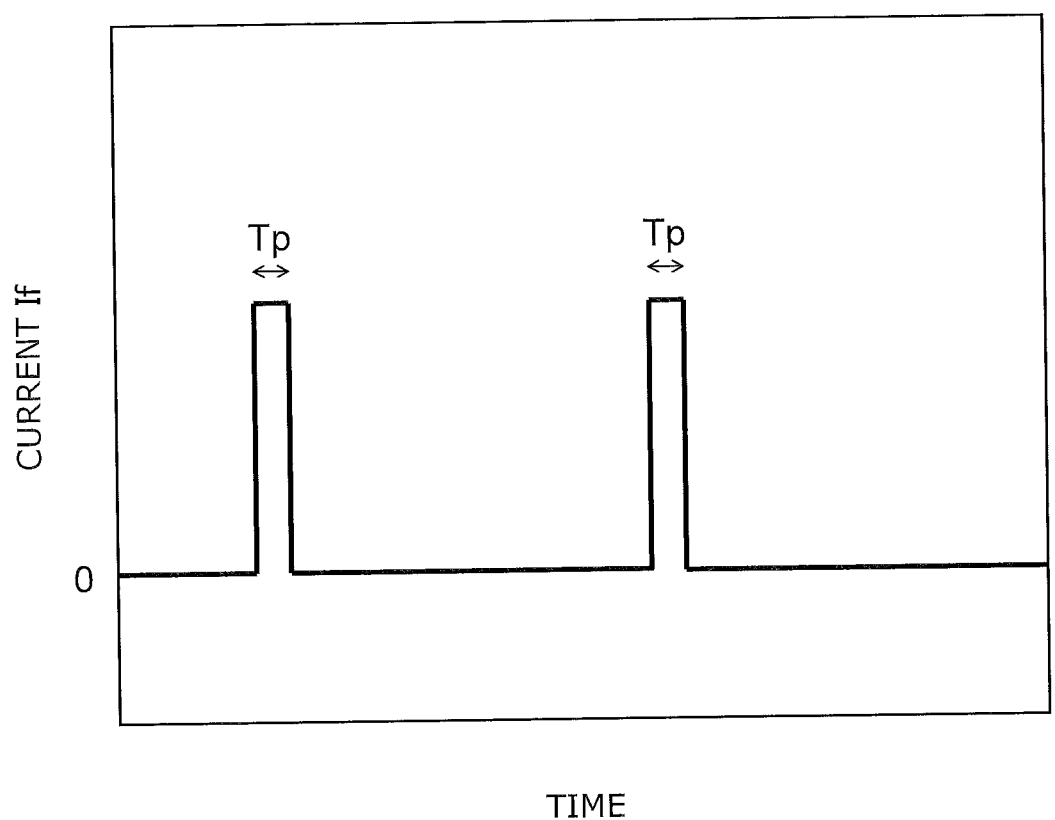
FIG. 6 is a graph showing a waveform of pulse current, in which the horizontal axis is time, and the vertical axis is the current If.

FIG. 6 is a graph showing the waveform of the pulse current, in which the horizontal axis is time, and the vertical axis is the current If.

First, as shown in step S1 of FIG. 5, the information that relates to the type of the ultraviolet-curing resin 100 to be cured is input to the controller 17 of the ultraviolet irradiation device 1.

Then, as shown in step S2, the controller 17 acquires the maximum-efficiency wavelength of the ultraviolet-curing resin 100 from the internal memory.

Continuing as shown in step S3, the controller 17 selects the light-emitting element 12 to emit the ultraviolet ray based on the relationship between the junction temperature Tj and the peak wavelength for each light-emitting element 12 as shown in FIG. 4; and the controller 17 acquires the target temperature of the junction temperature Tj of the selected light-emitting element 12.

Then, as shown in step S4, the controller 17 drives the temperature control element 14 by controlling the temperature control element controller 15, and controls the junction temperature Tj of the light-emitting element 12 to approach the target temperature. The junction temperature Tj of the light-emitting element 12 is feed back to the controller 17 and the temperature control element controller 15 by the temperature detection element 13.

Continuing as shown in step S5, when the junction temperature Tj of the light-emitting element 12 reaches the target temperature, the controller 17 controls the constant current driver 16 to output a pulse current.

As shown in FIG. 6, for one pulse of the pulse current, a duration Tp is 10 ms or less; and the duty ratio is 0.01 or less.

The pulse current is supplied to the selected light-emitting element 12 via the mounting substrate 10. Thereby, the selected light-emitting element 12 emits an ultraviolet ray having a peak wavelength near the maximum-efficiency wavelength acquired in step S2. At this time, a pulse current is not supplied to the unselected light-emitting elements 12; and the unselected light-emitting elements 12 do not emit ultraviolet rays.

As a result, the ultraviolet irradiation device 1 causes pulse irradiation on the ultraviolet-curing resin 100 of an ultraviolet ray having a peak wavelength corresponding to the maximum-efficiency wavelength of the ultraviolet-curing resin 100; and the ultraviolet-curing resin 100 is cured. The pulse width of the pulse irradiation is 10 ms or less; and the duty ratio of the pulse irradiation is 0.01 or less.

Effects of the embodiment will now be described.

In the embodiment, the peak wavelength can be selected within a prescribed range by controlling the junction temperature Tj of the light-emitting element 12. Thereby, the ultraviolet ray that includes the component of the maximum-efficiency wavelength according to the type of the ultraviolet-curing resin 100 can be emitted; and the ultraviolet-curing resin 100 can be cured efficiently.

In the embodiment, by providing multiple light-emitting elements 12 having mutually-different peak wavelengths, the ultraviolet ray is emitted by selecting one light-emitting element 12 according to the necessary peak wavelength and by controlling the junction temperature Tj. Thereby, the peak wavelength can be selected from a wide range. Also, a seamless control is possible because parts of the control ranges of the peak wavelengths of the different light-emitting elements 12 overlap each other. By setting the overlap range of the peak wavelength to be 5 nm or less, unnecessary overlapping can be avoided; and a wide wavelength range can be covered.

In the embodiment, the current If that is supplied to the light-emitting element 12 is a pulse current. Thereby, the increase of the junction temperature Tj of the light-emitting element 12 due to the conduction of the current If can be prevented; and the fluctuation of the peak wavelength can be suppressed. The fluctuation of the peak wavelength can be prevented more reliably by setting the pulse width of the pulse current to be 10 milliseconds or less and by setting the duty ratio of the pulse current to be 0.01 or less. If an appropriate feedback control is not performed when supplying the current If to the light-emitting element 12 for a long period of time, the junction temperature Tj of the light-emitting element 12 may increase; and the peak wavelength undesirably may shift to the longer-wavelength side away from the maximum-efficiency wavelength.

Although an example is shown in the embodiment in which the information relating to the maximum-efficiency wavelength of each type of ultraviolet-curing resin and the information of the relationship between the junction temperature Tj and the peak wavelength for each light-emitting element 12 are stored in the controller 17, this is not limited thereto.

For example, the information that relates to the maximum-efficiency wavelength of each resin may be input to the controller 17 from the outside. In such a case, the procedure shown in step S1 is unnecessary; and the controller 17 acquires the information relating to the maximum-efficiency wavelength from the outside in step S2.

Both the information relating to the maximum-efficiency wavelength of each resin and the information of the relationship between the junction temperature Tj and the peak wavelength for each light-emitting element 12 may be input to the controller 17 from the outside. In such a case, the procedures shown in steps S1 and S2 are unnecessary; and the controller 17 acquires the information of the light-emitting element 12 to be selected and the information of the target temperature of the junction temperature Tj of the light-emitting element 12 from the outside in step S3.

Second Embodiment

Figure 7:
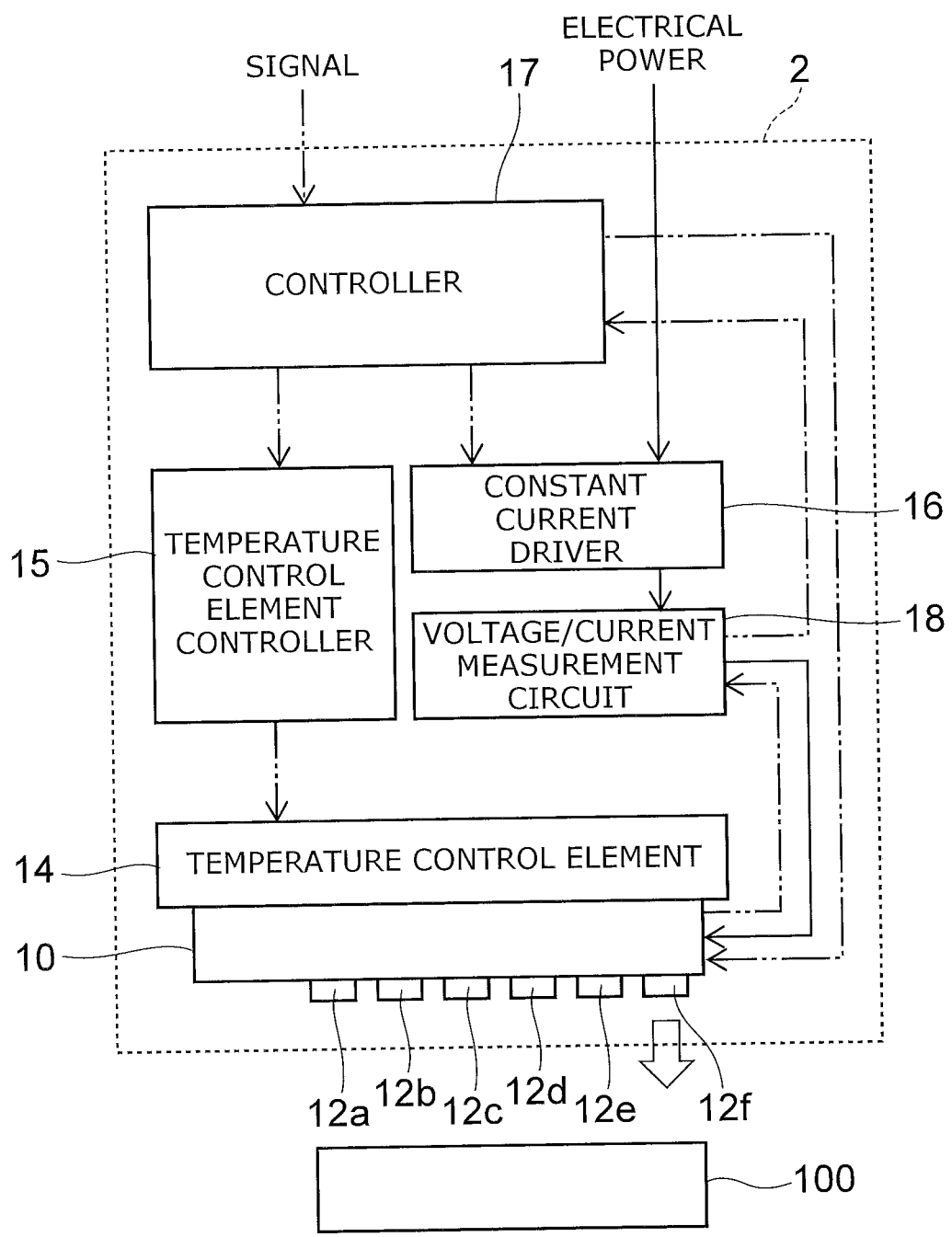
FIG. 7 is a block diagram showing an ultraviolet irradiation device according to a second embodiment.

FIG. 7 is a block diagram showing an ultraviolet irradiation device according to the embodiment.

As shown in FIG. 7, the ultraviolet irradiation device 2 according to the embodiment differs from the ultraviolet irradiation device 1 according to the first embodiment described above (referring to FIG. 1) in that the temperature detection element 13 is not provided; and a voltage/current measurement circuit 18 is provided.

The voltage/current measurement circuit 18 measures the current If having the pulse form from the constant current driver 16 toward the mounting substrate 10, measures a voltage Vf applied between the anode-cathode of the light-emitting element 12, and outputs the measurement result to the controller 17. Based on the current If and the voltage Vf, the controller 17 estimates the junction temperature Tj of the light-emitting element 12. The voltage Vf decreases as the junction temperature Tj of the light-emitting element 12 increases. The relationship between the junction temperature Tj of the light-emitting element 12, the current If, and the voltage Vf are pre-acquired and are prestored in the internal memory of the controller 17. The junction temperature Tj of the light-emitting element 12 may be estimated based on only the voltage Vf. Thus, the junction temperature Tj of the light-emitting element 12 is caused to approach the target temperature. The controller 17 may control the temperature control element controller 15 and provide feedback based on the estimated value of the junction temperature Tj of the light-emitting element 12. More precise control is possible thereby.

In according to the embodiment as well, the junction temperature Tj of the light-emitting element 12 can be controlled with high precision; and pulse irradiation of the ultraviolet ray of the desired wavelength can be performed. Otherwise, the configuration, the operations, and the effects of the embodiment are similar to those of the first embodiment.

Specific Example of Second Embodiment

Figure 8:
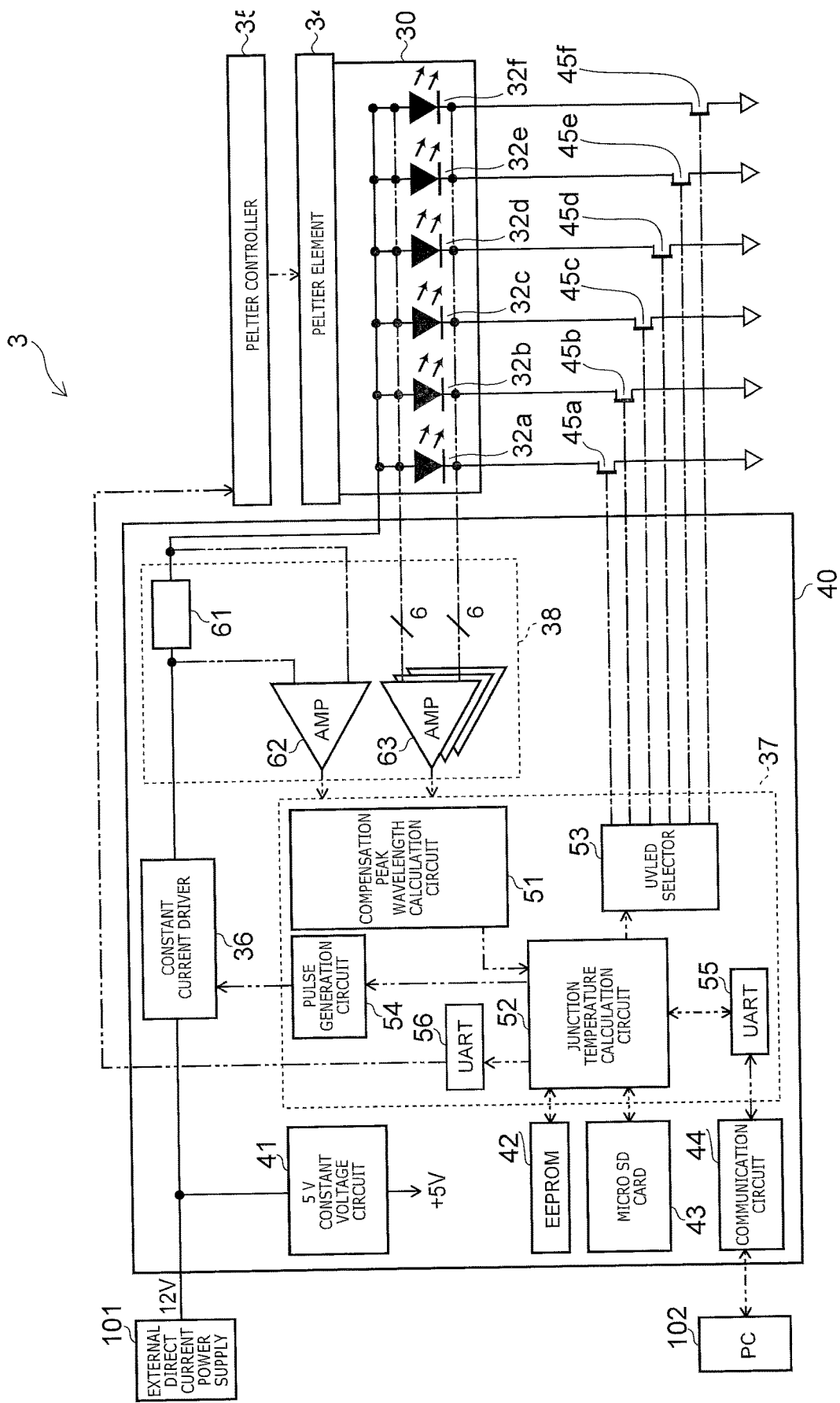
FIG. 8 is a block diagram showing an ultraviolet irradiation device according to a specific example of the second embodiment.

FIG. 8 is a block diagram showing an ultraviolet irradiation device according to this specific example.

Figure 9:
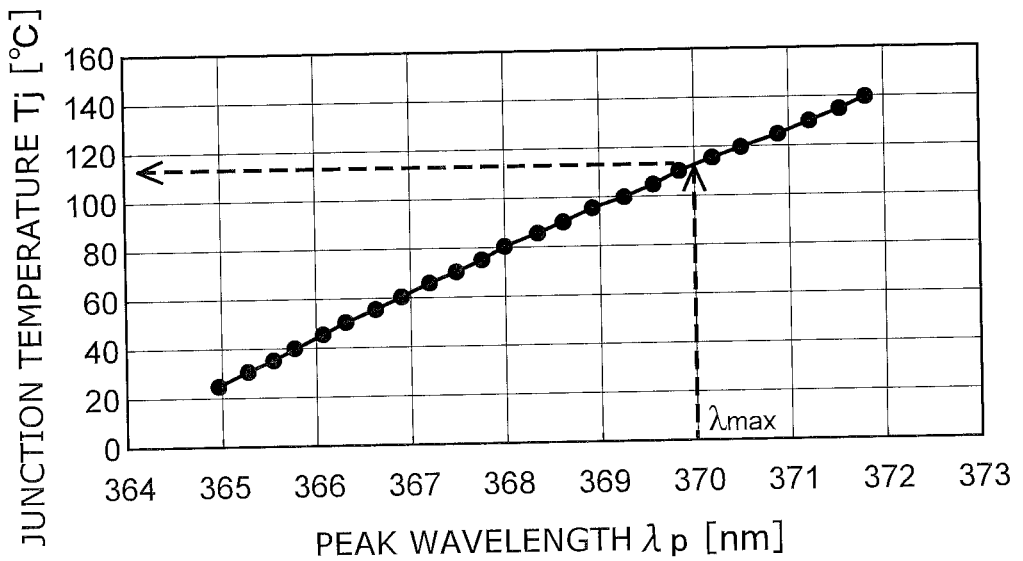
FIG. 9 is a graph showing a correlation between a peak wavelength $\lambda p$ and a junction temperature Tj of the specific example of the second embodiment, in which the horizontal axis is the peak wavelength $\lambda p$, and the vertical axis is the junction temperature Tj.

FIG. 9 is a graph showing the correlation between the peak wavelength λp and the junction temperature Tj of this specific example, in which the horizontal axis is the peak wavelength λp, and the vertical axis is the junction temperature Tj.

Figure 10:
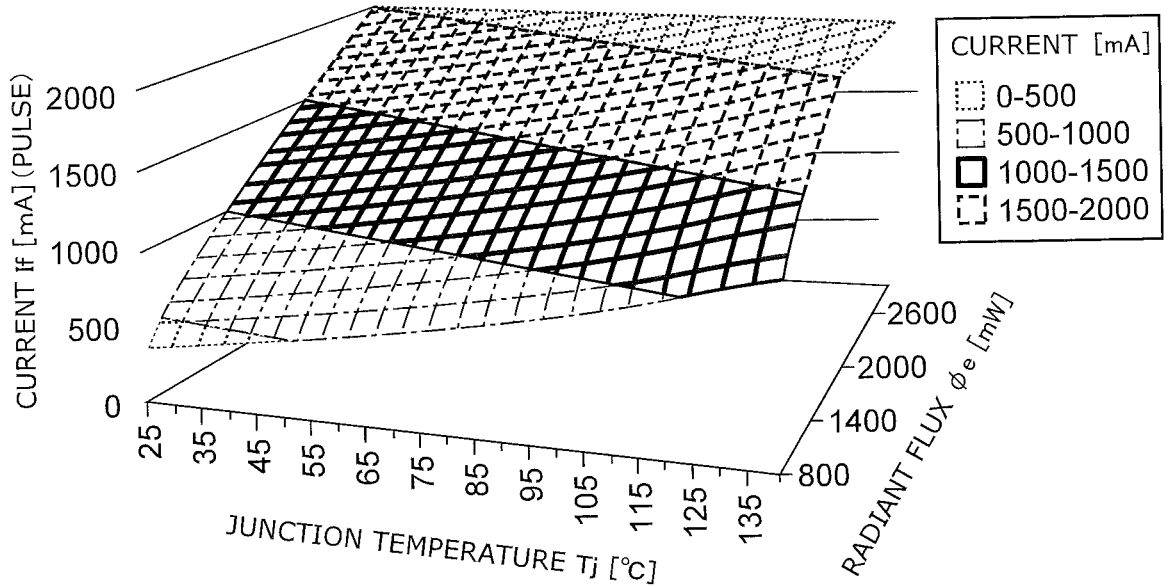
FIG. 10 is a graph showing a correlation between the junction temperature Tj, radiant flux $\phi e$, and the current If of the specific example of the second embodiment.

FIG. 10 is a graph showing the correlation between the junction temperature Tj, radiant flux φe, and the current If of this specific example.

As shown in FIG. 8, the ultraviolet irradiation device 3 according to this specific example includes a mounting substrate 30, UVLEDs 32a to 32f (hereinbelow, also generally referred to as the "UVLED 32") as light-emitting elements, a Peltier element 34 as a temperature control element, a Peltier controller 35 as a temperature control element controller, a constant current driver 36, a controller (or control circuit) 37, and a voltage/current measurement circuit 38. The general functions of these components are similar to the functions of the components of the same names in the second embodiment described above.

The ultraviolet irradiation device 3 also includes a 5 V constant voltage circuit 41, EEPROM (Electrically Erasable Programmable Read-Only Memory) 42 as internal memory, a micro SD card 43, a communication circuit 44, and switching elements 45a to 45f (hereinbelow, also generally referred to as the "switching element 45"). The constant current driver 36, the controller 37, the voltage/current measurement circuit 38, the 5 V constant voltage circuit 41, the EEPROM 42, the micro SD card 43, and the communication circuit 44 are mounted to a controller board 40. The switching elements 45a to 45f are connected respectively between the ground potential and the UVLEDs 32a to 32f.

For example, the constant current driver 36 and the 5 V constant voltage circuit 41 are connected to an external direct current power supply 101 of 12 V (volts). The communication circuit 44 is connected to an external personal computer 102.

The 5 V constant voltage circuit 41 converts the direct current of 12 V supplied from the external direct current power supply 101 into, for example, a constant-voltage current of 5 V and supplies the constant-voltage current to the control system of the controller 37, the voltage/current measurement circuit 38, the Peltier element 34, the Peltier controller 35, etc. The voltage that is supplied from the external direct current power supply 101 is not limited to 12 V; and the voltage that is supplied to the internal control system by the constant voltage circuit is not limited to 5 V. For example, the voltage that is supplied to the internal control system may be in the range of 1.2 to 12 V and may be, for example, 3.3 V or 5 V.

For example, the EEPROM 42 or the micro SD card 43 stores the information of the relationship between the peak wavelength λp and the junction temperature Tj of the UVLED 32 in the format of formulas or tables. For example, a correlation such as that shown in FIG. 9 is stored in the format of a formula. The EEPROM 42 or the micro SD card 43 also stores the information of the relationship between the junction temperature Tj of the UVLED 32, the radiant flux φe, and the current If. For example, a correlation such as that shown in FIG. 10 is stored in the format of a formula. Such information may be stored in the personal computer 102.

The communication circuit 44 is connected to the external personal computer 102 by a communication cable such as a USB cable, etc. The setting value of the peak wavelength λp and the setting value of the radiant flux φe are input to the communication circuit 44 from the personal computer 102; and these setting values are output to the controller 37.

A compensation peak wavelength calculation circuit 51, a junction temperature calculation circuit 52, an UVLED selector 53, a pulse generation circuit 54, and UARTs (Universal Asynchronous Receiver/Transmitters) 55 and 56 are provided in the controller 37.

The compensation peak wavelength calculation circuit 51 measures the current If having the pulse form based on an output signal of an If-sample-and-hold differential amplifier 62. Based on the voltage Vf and the current If, the junction temperature Tj of the UVLED 32 is detected; and the peak wavelength λp that corresponds to the junction temperature Tj is calculated. Then, the detection result of the junction temperature Tj and the calculation result of the peak wavelength λp are output to the junction temperature calculation circuit 52.

The junction temperature calculation circuit 52 acquires the junction temperature Tj based on the setting value of the peak wavelength λp input via the communication circuit 44 and the UART 55. At this time, information that is stored in the EEPROM 42 and the micro SD card 43 are referred to when converting from the peak wavelength λp to the junction temperature Tj. Then, the acquired junction temperature Tj is output to the Peltier controller 35 via the UART 56. The UART 56 and the Peltier controller 35 are connected by a communication cable such as a USB cable, etc.

The junction temperature calculation circuit 52 outputs a pulse signal to the constant current driver 36 via the pulse generation circuit 54. The constant current driver 36 outputs a pulse current based on the pulse signal.

The junction temperature calculation circuit 52 controls the UVLED selector 53, sets one selected switching element 45 of the switching elements 45a to 45f of the UVLED selector 53 to the ON-state, and sets the other switching elements 45 to the OFF-state.

Referring to the calculated value of the peak wavelength λp input from the compensation peak wavelength calculation circuit 51, the junction temperature calculation circuit 52 detects the error between the setting value and the calculated value of the peak wavelength. Also, the junction temperature calculation circuit 52 calculates the radiant flux φe based on the detection result of the junction temperature Tj input from the compensation peak wavelength calculation circuit 51. When calculating, the information of the relationship between the junction temperature Tj and the radiant flux φe stored in the EEPROM 42 or the micro SD card 43 is referred to.

A current detection resistor 61, the If-sample-and-hold differential amplifier 62, and a Vf-sample-and-hold differential amplifier 63 are provided in the voltage/current measurement circuit 38. The current detection resistor 61 is connected between the constant current driver 36 and the UVLED 32. The If-sample-and-hold differential amplifier 62 detects the potential difference between the two ends of the current detection resistor 61 and outputs the result to the compensation peak wavelength calculation circuit 51. The same number of Vf-sample-and-hold differential amplifiers 63 as the UVLEDs 32, e.g., six are provided. The Vf-sample-and-hold differential amplifiers 63 respectively measure the anode-cathode voltages Vf of the UVLEDs 32 and output the results to the compensation peak wavelength calculation circuit 51.

The operation of the ultraviolet irradiation device 3 according to this specific example will now be described.

Figure 11:
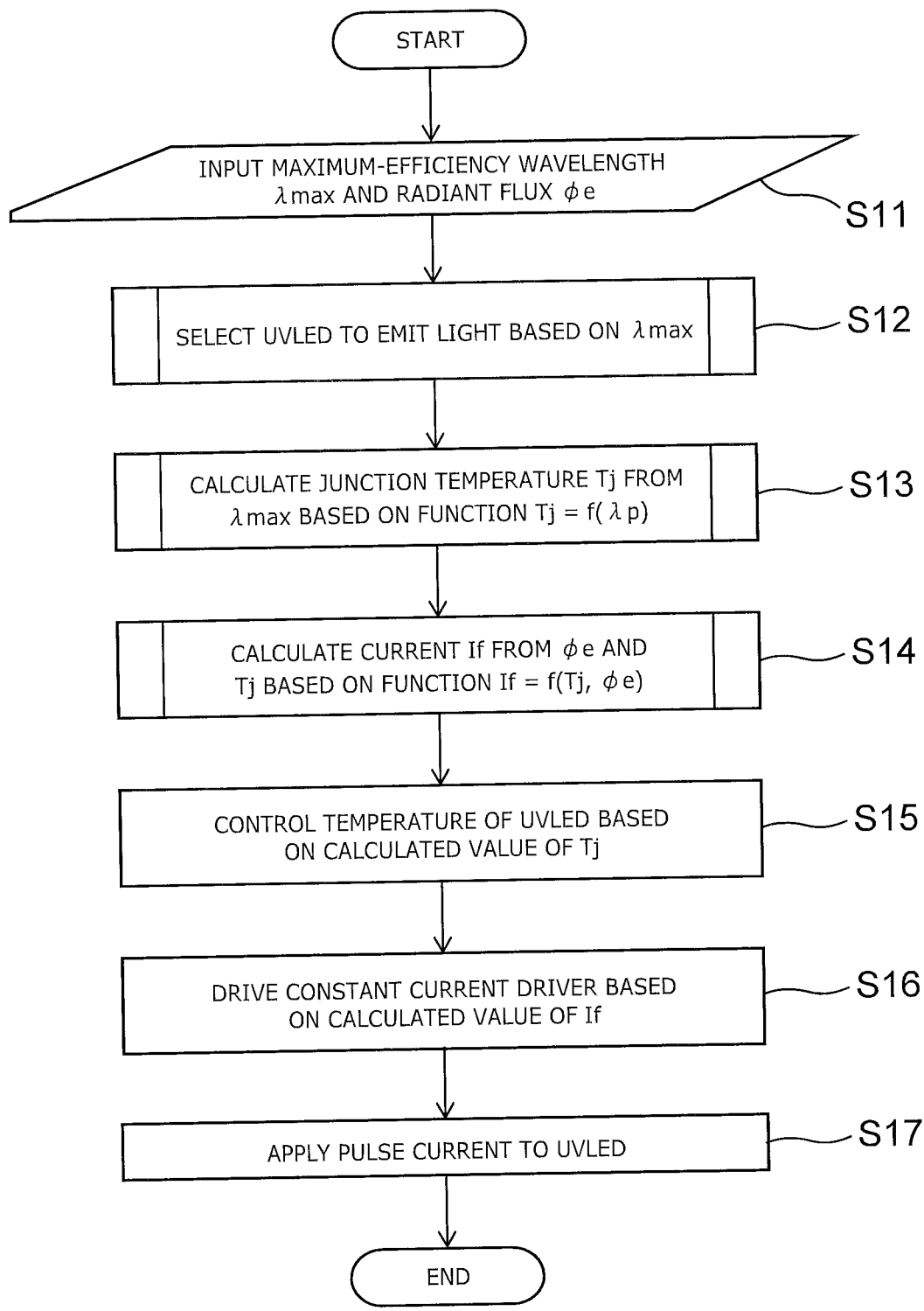
FIG. 11 is a flowchart showing an operation of the ultraviolet irradiation device according to the specific example of the second embodiment.

FIG. 11 is a flowchart showing the operation of the ultraviolet irradiation device according to this specific example.

A correlation between the peak wavelength λp and the junction temperature Tj such as that shown in FIG. 9 is predetermined for each UVLED 32 and stored in, for example, the format of a formula in the EEPROM 42 or the micro SD card 43. Also, the correlation between the junction temperature Tj, the radiant flux φe, and the current If such as that shown in FIG. 10 is predetermined for each UVLED 32 and stored in, for example, the format of a formula in the EEPROM 42 or the micro SD card 43.

For example, a direct current of 12 V is supplied from the external direct current power supply 101 to the constant current driver 36 and the 5 V constant voltage circuit 41 of the ultraviolet irradiation device 3. The 5 V constant voltage circuit 41 converts the direct current of 12 V into a direct current of 5 V and supplies the direct current to each circuit included in the control system of the ultraviolet irradiation device 3, e.g., the controller 37. The control system inside the ultraviolet irradiation device 3 can operate thereby.

In this state, the information of the type of the ultraviolet-curing resin 100 to be cured (referring to FIG. 7) is input to the external personal computer 102. Information that relates to the radiant flux φe and a maximum-efficiency wavelength λmax of each type of resin is stored in the personal computer 102. The personal computer 102 sets the maximum-efficiency wavelength λmax and the radiant flux φe according to the type of the resin to be cured.

As shown in step S11 of FIG. 11, the personal computer 102 transmits the setting values of the radiant flux φe and the maximum-efficiency wavelength λmax of the ultraviolet-curing resin 100 to the communication circuit 44 of the ultraviolet irradiation device 3. The communication circuit 44 outputs this information to the junction temperature calculation circuit 52 via the UART 55.

As shown in step S12, the junction temperature calculation circuit 52 refers to the relationship between the peak wavelength λp and the junction temperature Tj stored in the EEPROM 42 or the micro SD card 43 and selects, based on the maximum-efficiency wavelength λmax, the UVLED 32 to be caused to emit light. Then, the junction temperature calculation circuit 52 controls the UVLED selector 53, sets the switching element 45 connected to the selected UVLED 32 to the ON-state, and sets the other switching elements 45 to the OFF-state.

Continuing as shown in step S13, referring to the function Tj=f(λp) such as that shown in FIG. 9, the junction temperature calculation circuit 52 calculates the target value of the junction temperature Tj of the selected UVLED 32 from the maximum-efficiency wavelength λmax. The function shown in FIG. 9 is, for example, a quadratic function of the junction temperature Tj. In the example shown in FIG. 9, the target value of the junction temperature Tj is 112° C. when the maximum-efficiency wavelength λmax is 370 nm.

As shown in step S14, based on the function If=f(Tj, φe) such as that shown in FIG. 10, the junction temperature calculation circuit 52 calculates the current If from the setting value of the radiant flux φe input in step S11 and the target value of the junction temperature Tj calculated in step S13. The function shown in FIG. 10 is, for example, a cubic function of the junction temperature Tj and the radiant flux φe.

Then, as shown in step S15, the junction temperature calculation circuit 52 transmits, to the Peltier controller 35 via the UART 56, a signal of the target value of the junction temperature Tj of the UVLED 32. Based on this signal, the Peltier controller 35 drives the Peltier element 34 and controls the temperature of the UVLED 32 via the mounting substrate 30.

Subsequently, as shown in step S16, based on the calculated value of the current If calculated in step S14, the junction temperature calculation circuit 52 outputs a control signal to the pulse generation circuit 54. Based on the control signal, the pulse generation circuit 54 drives the constant current driver 36.

Thereby, as shown in step S17, the constant current driver 36 outputs a pulse current. As shown in FIG. 6, the duration of one pulse of the pulse current is 10 ms or less; and the duty ratio of the pulse current is 0.01 or less. The pulse current flows through the selected one UVLED 32, i.e., the UVLED 32 connected to the switching element 45 set to the ON-state. At this time, the junction temperature Tj of the UVLED 32 is set to the prescribed temperature. Thereby, pulse irradiation of the ultraviolet ray having the prescribed peak wavelength is performed by the UVLED 32. As a result, the ultraviolet-curing resin 100 is cured.

At this time, the voltage of the pulse current drops by passing through the current detection resistor 61. The If-sample-and-hold differential amplifier 62 detects the voltage drop amount and outputs the voltage drop amount to the compensation peak wavelength calculation circuit 51. Among the Vf-sample-and-hold differential amplifiers 63, the amplifier 63 that is connected to the selected UVLED 32 detects the anode-cathode voltage Vf of the selected UVLED 32 and outputs the voltage Vf to the compensation peak wavelength calculation circuit 51.

Based on the output signal of the If-sample-and-hold differential amplifier 62, the compensation peak wavelength calculation circuit 51 calculates the current If. Then, the junction temperature Tj of the UVLED 32 is estimated based on the current If and the voltage Vf input from the Vf-sample-and-hold differential amplifier 63. Then, the peak wavelength λp is calculated based on the junction temperature Tj. Then, the estimated value of the junction temperature Tj and the calculated value of the peak wavelength λp are output to the junction temperature calculation circuit 52.

Based on the estimated value of the junction temperature Tj, the junction temperature calculation circuit 52 refers to the relationship between the junction temperature Tj and the radiant flux φe stored in the EEPROM 42 or the micro SD card 43 and calculates the radiant flux φe. Then, feedback is provided to the Peltier controller 35 and the pulse generation circuit 54 by using the calculated value of the radiant flux φe and the calculated value of the peak wavelength λp input from the compensation peak wavelength calculation circuit 51. Thus, the radiant flux φe and the junction temperature Tj of the UVLED 32 approach the target values.

According to this specific example, the junction temperature Tj of the UVLED 32 can be estimated based on the current If and the anode-cathode voltage Vf of the selected UVLED 32.

Otherwise, the configuration, the operations, and the effects of this specific example are similar to those of the second embodiment.

In the specific example, multiple UVLEDs 32 may be connected in series to one switching element 45 to increase the radiant flux φe.

Third Embodiment

Figure 12:
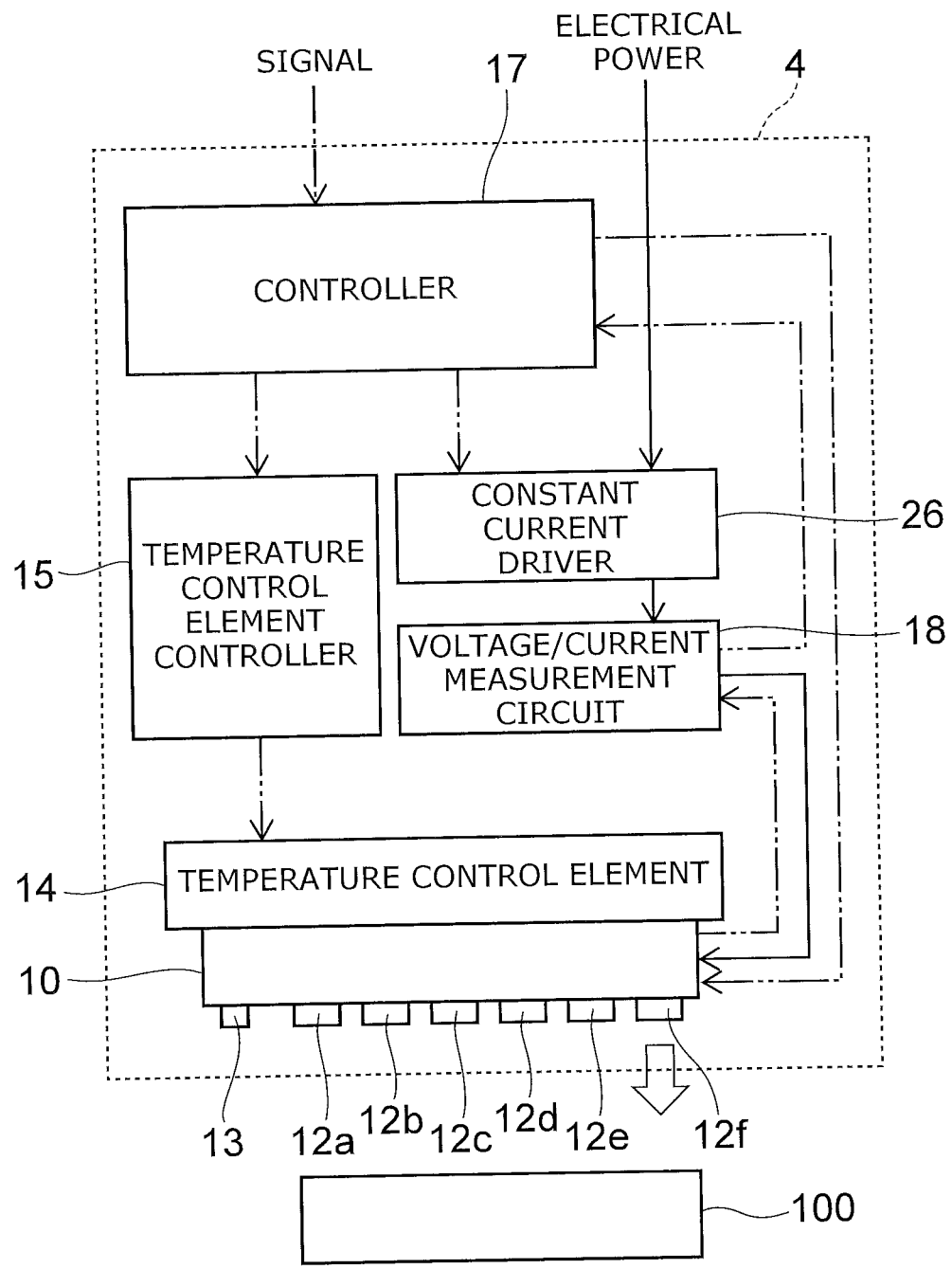
FIG. 12 is a block diagram showing an ultraviolet irradiation device according to a third embodiment.

FIG. 12 is a block diagram showing an ultraviolet irradiation device according to the embodiment.

As shown in FIG. 12, the ultraviolet irradiation device 4 according to the embodiment differs from the ultraviolet irradiation device 2 according to the second embodiment described above (referring to FIG. 7) in that a constant current driver 26 is provided instead of the constant current driver 16; and the temperature detection element 13 is provided in the front surface 10a of the mounting substrate 10. The constant current driver 16 of the second embodiment outputs a pulse current; but the constant current driver 26 of the embodiment outputs a continuous direct current. The constant current driver 26 also can output a pulse current of any duration.

In the embodiment, the voltage/current measurement circuit 18 measures the current If output from the constant current driver 26 and measures the voltage Vf applied between the anode-cathode of the light-emitting element 12 while the controller 17 causes the ultraviolet ray to be emitted continuously from the light-emitting element 12. The voltage/current measurement circuit 18 outputs the measurement results of the current If and the voltage Vf to the controller 17.

Based on the voltage Vf, the controller 17 estimates the junction temperature Tj of the light-emitting element 12 and controls the temperature control element controller 15 to cause the junction temperature Tj to approach the setting value. The temperature control element controller 15 drives the temperature control element 14 and controls the junction temperature Tj of the light-emitting element 12 via the mounting substrate 10.

Actually, a temperature Ts of the temperature detection element 13 is controlled because it is difficult to directly measure the junction temperature Tj. In the first and second embodiments, the junction temperature Tj substantially does not increase even when the light-emitting element 12 is conducted because the current supplied to the light-emitting element 12 is a pulse current. Therefore, the junction temperature Tj can be considered to be equal to the temperature Ts of the temperature detection element 13.

Conversely, in the embodiment, the increase of the junction temperature Tj of the light-emitting element 12 cannot be ignored because a continuous current is supplied to the light-emitting element 12. Therefore, the temperature Ts of the temperature detection element 13 is set to be lower than the junction temperature Tj to cause the junction temperature Tj to approach the setting value when conducting. In other words, Ts<Tj. Thereby, the temperature control element controller 15 controls the junction temperature Tj indirectly via the temperature Ts. Thus, feedback is provided for the junction temperature Tj in the period in which the light-emitting element 12 emits the ultraviolet ray.

Also, the controller 17 determines the setting value of the current If based on the estimated value of the junction temperature Tj and the setting value of the radiant flux φe. The voltage/current measurement circuit 18 is controlled so that the measured value of the current If input from the voltage/current measurement circuit 18 approaches the setting value of the current If. Thus, feedback is provided for the radiant flux φe in the period in which the light-emitting element 12 emits the ultraviolet ray.

According to the embodiment, the light-emitting element 12 can continuously emit the ultraviolet ray of the prescribed peak wavelength 4. Thereby, the ultraviolet-curing resin 100 can be cured in a shorter period of time because the ultraviolet ray of the maximum-efficiency wavelength λmax can be irradiated continuously on the ultraviolet-curing resin 100. Otherwise, the configuration, the operations, and the effects of the embodiment are similar to those of the second embodiment.

Specific Example of Third Embodiment

Figure 13:
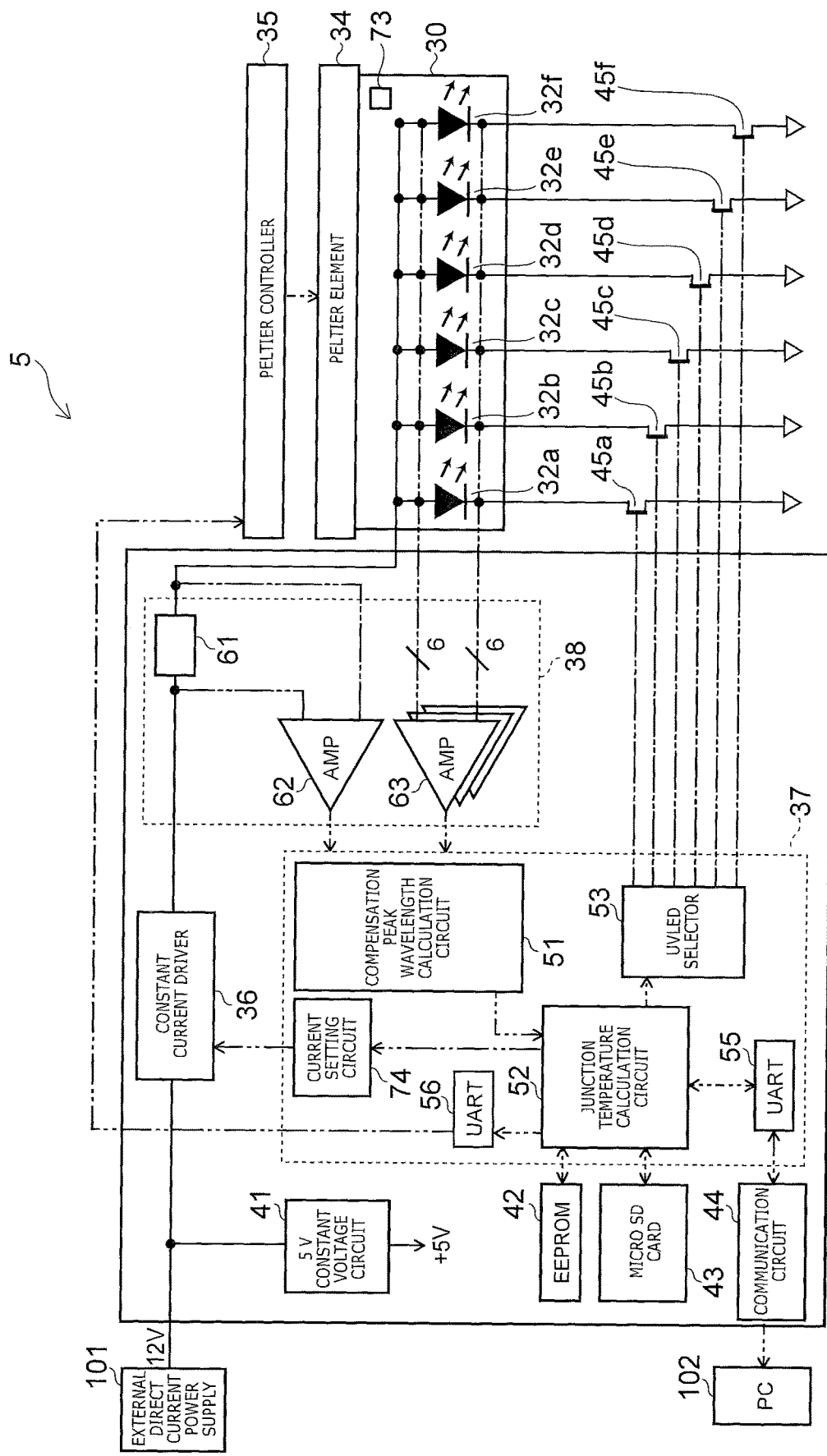
FIG. 13 is a block diagram showing an ultraviolet irradiation device according to a specific example of the third embodiment.

FIG. 13 is a block diagram showing an ultraviolet irradiation device according to this specific example.

As shown in FIG. 13, the ultraviolet irradiation device 5 according to this specific example differs from the ultraviolet irradiation device 3 according to the specific example of the second embodiment (referring to FIG. 8) in that a current setting circuit 74 is provided instead of the pulse generation circuit 54; and a temperature detection element 73 is mounted to the mounting substrate 30.

The current setting circuit 74 sets the continuous direct current If. Thereby, the direct current If that is set to a prescribed magnitude can be output continuously to the constant current driver 36. The current setting circuit 74 also can generate a pulse of any duration as necessary. In such a case, similarly to the specific example of the second embodiment, the constant current driver 36 outputs a pulse current. Also, the junction temperature calculation circuit 52 controls the junction temperature Tj of the UVLED 32 indirectly by controlling the temperature Ts of the temperature detection element 73.

The operation of the ultraviolet irradiation device 5 according to this specific example will now be described.

In this specific example, the UVLED 32 is caused to continuously emit the ultraviolet ray. Therefore, the UVLED 32 generates heat. Therefore, the temperature Ts and the current If are controlled by actively providing feedback to maintain the temperature of the UVLED 32 within a constant range.

Figure 14:
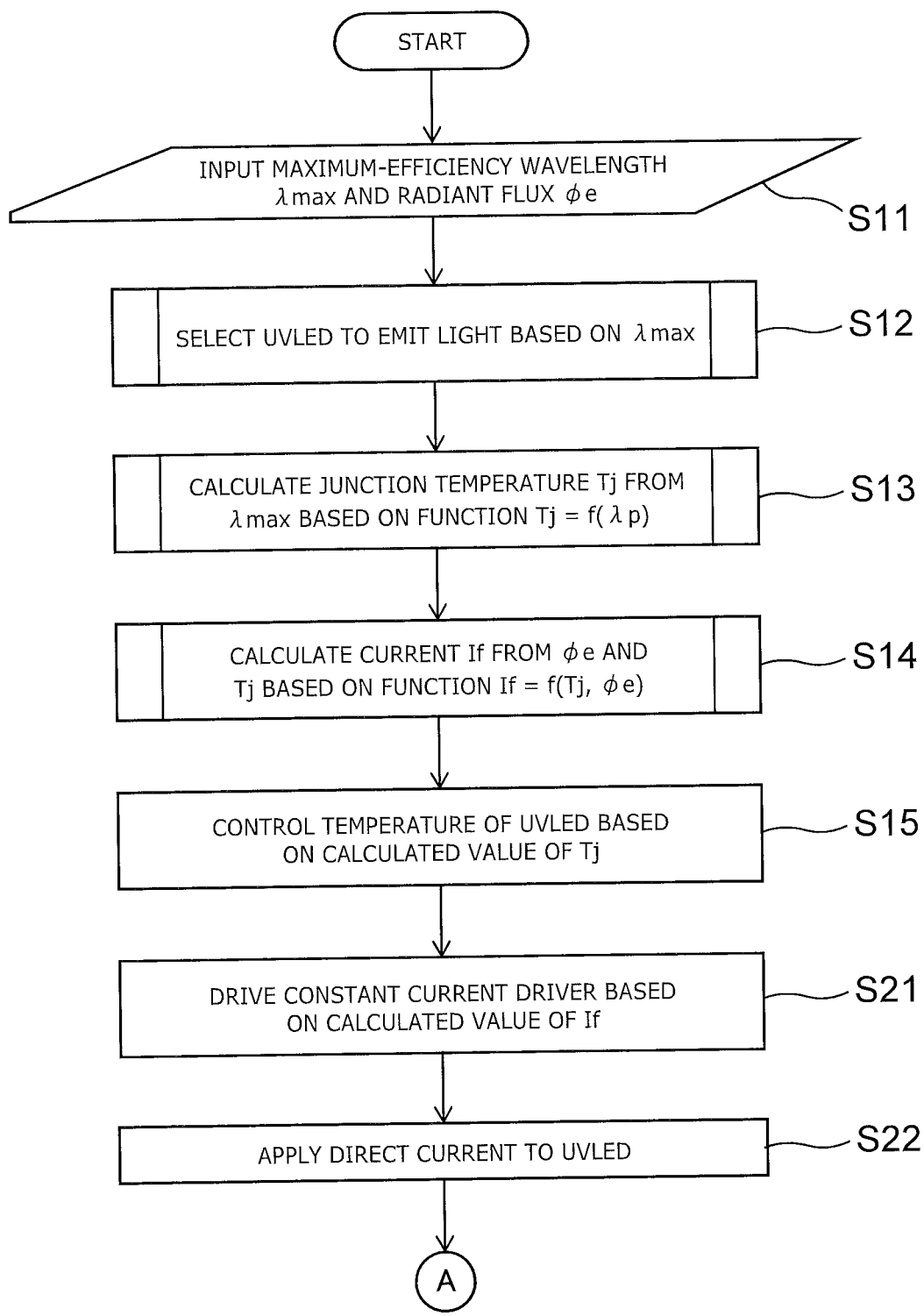
FIG. 14 and FIG. 15 are flowcharts showing an operation of the ultraviolet irradiation device according to the specific example of the third embodiment.
Figure 15:
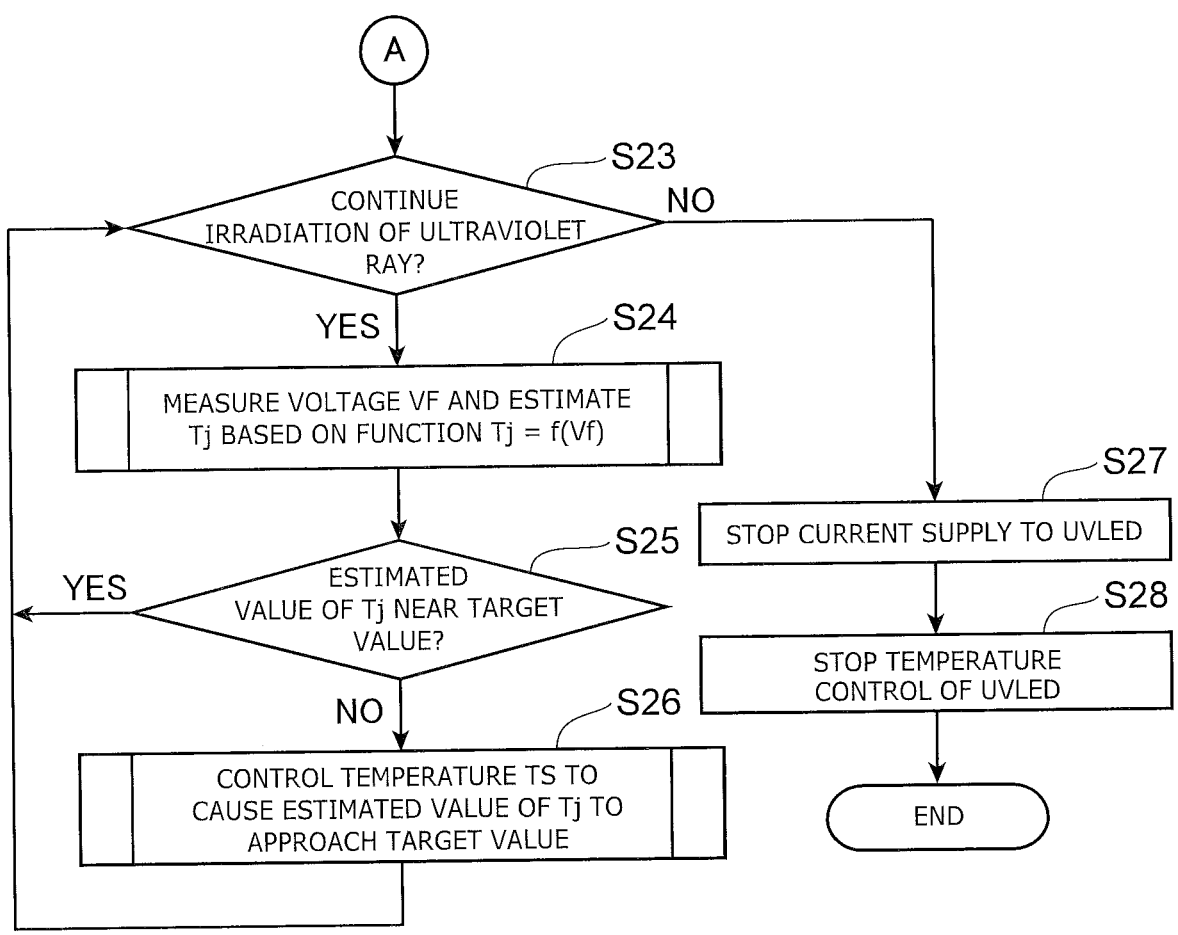

FIG. 14 and FIG. 15 are flowcharts showing the operation of the ultraviolet irradiation device according to this specific example.

First, the processes shown in steps S11 to S15 of FIG. 14 are performed. The content of these processes is similar to the specific example of the second embodiment described above (referring to FIG. 8 to FIG. 11) and is therefore described summarily.

First, as shown in step S11, the radiant flux φe and the maximum-efficiency wavelength λmax of the ultraviolet ray suited to curing the ultraviolet-curing resin 100 are acquired. At this time, the irradiation time of the ultraviolet ray also may be acquired. The irradiation time of the ultraviolet ray is predetermined and is dependent on the peak wavelength λp and the radiant flux φe of the ultraviolet ray, the type and the amount of the ultraviolet-curing resin 100 to be cured, etc.

Then, as shown in step S12, the UVLED 32 to emit light is selected based on the maximum-efficiency wavelength λmax.

Continuing as shown in step S13, the first relationship between the voltage Vf or the junction temperature Tj of the UVLED 32 and the peak wavelength λp of the ultraviolet ray emitted by the UVLED 32, e.g., the function shown in FIG. 9 is acquired. Then, based on the function, the target value of the junction temperature Tj is calculated from the maximum-efficiency wavelength λmax.

Then, as shown in step S14, the second relationship between the radiant flux φe of the ultraviolet ray and the current If flowing in the UVLED 32, e.g., the function shown in FIG. 10 is acquired. Then, based on the function, the setting value of the current If is calculated from the radiant flux φe and the junction temperature Tj.

Continuing as shown in step S15, the temperature of the UVLED 32 is controlled based on the target value of the temperature Tj.

The following processes are different from the specific example of the second embodiment.

As shown in step S21 of FIG. 14, based on the setting value of the current If calculated in step S14, the junction temperature calculation circuit 52 outputs a control signal to the current setting circuit 74. Based on the control signal, the current setting circuit 74 drives the constant current driver 36.

Thereby, as shown in step S22, the constant current driver 36 outputs a continuous direct current. The direct current is supplied to the selected one UVLED 32. Thereby, the UVLED 32 starts to irradiate the ultraviolet ray. Accordingly, the UVLED 32 generates heat.

Then, as shown in step S23 of FIG. 15, the junction temperature calculation circuit 52 determines whether or not to continue the irradiation of the ultraviolet ray. For example, the determination can be performed according to whether or not the time elapsed from the irradiation start of the ultraviolet ray has reached the prescribed irradiation time input in step S11. When the elapsed time from the irradiation start has not reached the prescribed irradiation time, the flow proceeds to step S24.

In step S24, the voltage Vf is measured; and the junction temperature Tj is estimated based on the measurement result and the function Tj=f(Vf) which is the first relationship. Specifically, the amplifier 63 measures the anode-cathode voltage Vf of the UVLED 32 and outputs the voltage Vf to the compensation peak wavelength calculation circuit 51. The compensation peak wavelength calculation circuit 51 estimates the junction temperature Tj of the UVLED 32 by substituting the measured value of the voltage Vf into the function Tj=f(Vf). Then, the estimated value of the junction temperature Tj is output to the junction temperature calculation circuit 52.

Then, as shown in step S25, the junction temperature calculation circuit 52 determines whether or not the estimated value of the junction temperature Tj estimated in step S24 is near the target value of the junction temperature Tj calculated in step S13. For example, the estimated value of the temperature Tj is determined to be near the target value when in the range not less than (target value−a ° C.) and not more than (target value+b ° C.), and is determined not to be near when outside the range recited above. The value a and the value b are arbitrary. If the estimated value of the junction temperature Tj is near the target value, the flow returns to step S23. If the estimated value of the junction temperature Tj is not near the target value, the flow proceeds to step S26.

In step S26, the temperature Ts is controlled so that the estimated value of the junction temperature Tj approaches the target value. Specifically, the junction temperature calculation circuit 52 transmits a signal of the target value of the temperature Ts to the Peltier controller 35 via the UART 56. Based on this signal, the Peltier controller 35 drives the Peltier element 34 and causes the temperature Ts of the temperature detection element 73 mounted to the mounting substrate 30 to approach the target value. The junction temperature Tj of the UVLED 32 is controlled indirectly thereby. Thus, feedback control of the junction temperature Tj is performed.

Also, at this time, based on the second relationship, e.g., the function If=f(Tj, φe) shown in FIG. 10, the junction temperature calculation circuit 52 corrects the current If according to the fluctuating junction temperature Tj. Then, the current If is controlled by driving the constant current driver 36 via the current setting circuit 74. Thus, feedback control of the current If is performed. Subsequently, the flow returns to step S23.

In the case where the junction temperature calculation circuit 52 determines in step S23 that the time elapsed from the irradiation start of the ultraviolet ray has not reached the prescribed irradiation time, the flow again proceeds to step S24; and the feedback control described above is repeated. On the other hand, in the case where it is determined that the time elapsed from the irradiation start of the ultraviolet ray has reached the prescribed irradiation time, the flow proceeds to step S27.

In step S27, the junction temperature calculation circuit 52 outputs a control signal to the current setting circuit 74; and the current setting circuit 74 stops the driving of the constant current driver 36. The supply of the current to the UVLED 32 is stopped thereby. As a result, the UVLED 32 stops irradiating the ultraviolet ray. Accordingly, the heat generation of the UVLED 32 also is stopped.

Then, as shown in step S28, the junction temperature calculation circuit 52 outputs a control signal to the Peltier controller 35 via the UART 56; and the Peltier controller 35 stops the driving of the Peltier element 34. The temperature control of the UVLED 32 is stopped thereby. Thus, the series of ultraviolet irradiation ends.

According to this specific example, feedback control of the current If and the junction temperature Tj of the UVLED 32 can be performed. Thereby, even when the UVLED 32 is caused to continuously irradiate the ultraviolet ray, the fluctuation of the junction temperature Tj and the fluctuation of the peak wavelength can be suppressed.

Otherwise, the configuration, the operations, and the effects of this specific example are similar to those of the specific example of the second embodiment.

Fourth Embodiment

Figure 16:
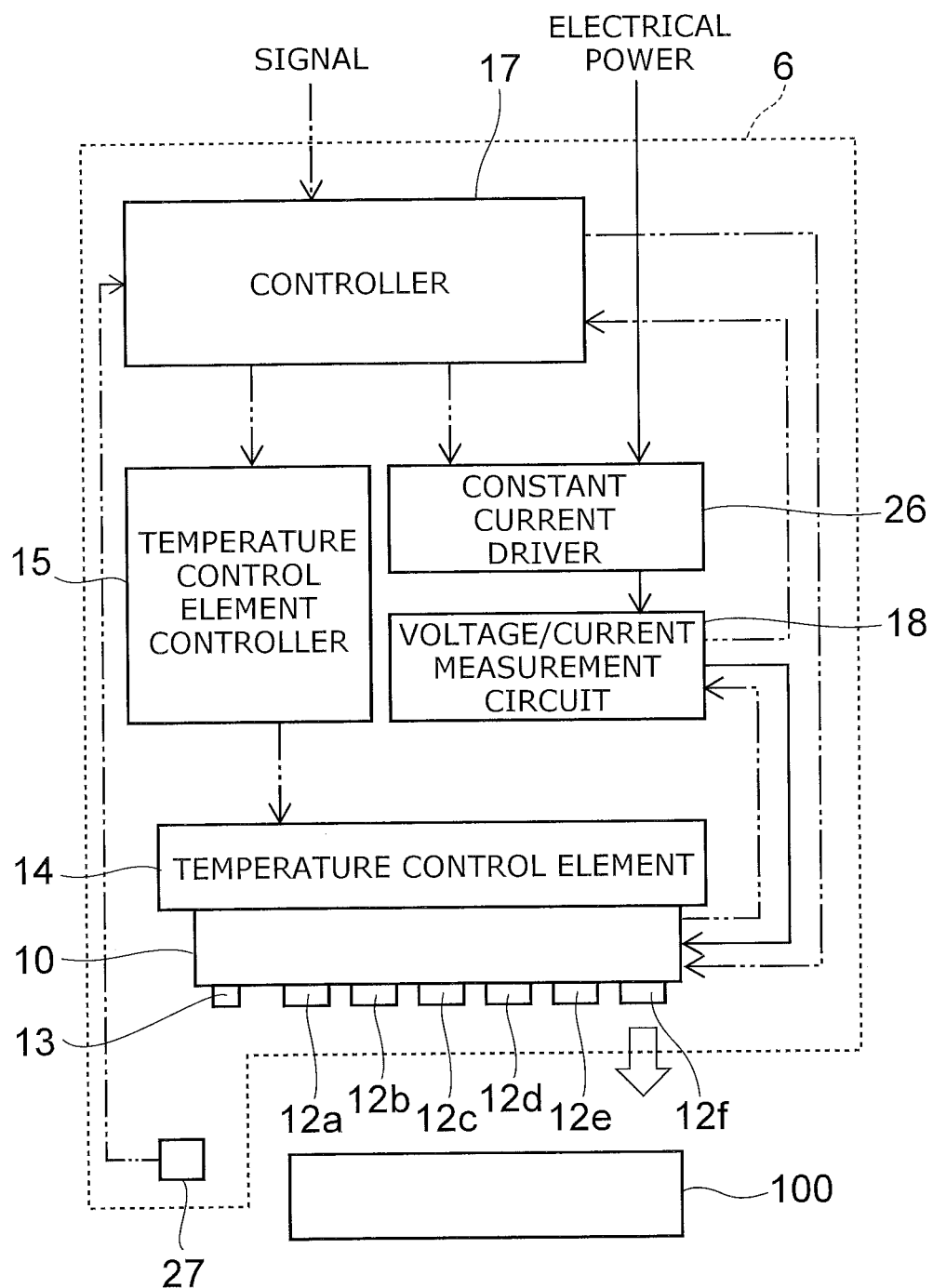
FIG. 16 is a block diagram showing an ultraviolet irradiation device according to a fourth embodiment.

FIG. 16 is a block diagram showing an ultraviolet irradiation device according to the embodiment.

Figure 17:
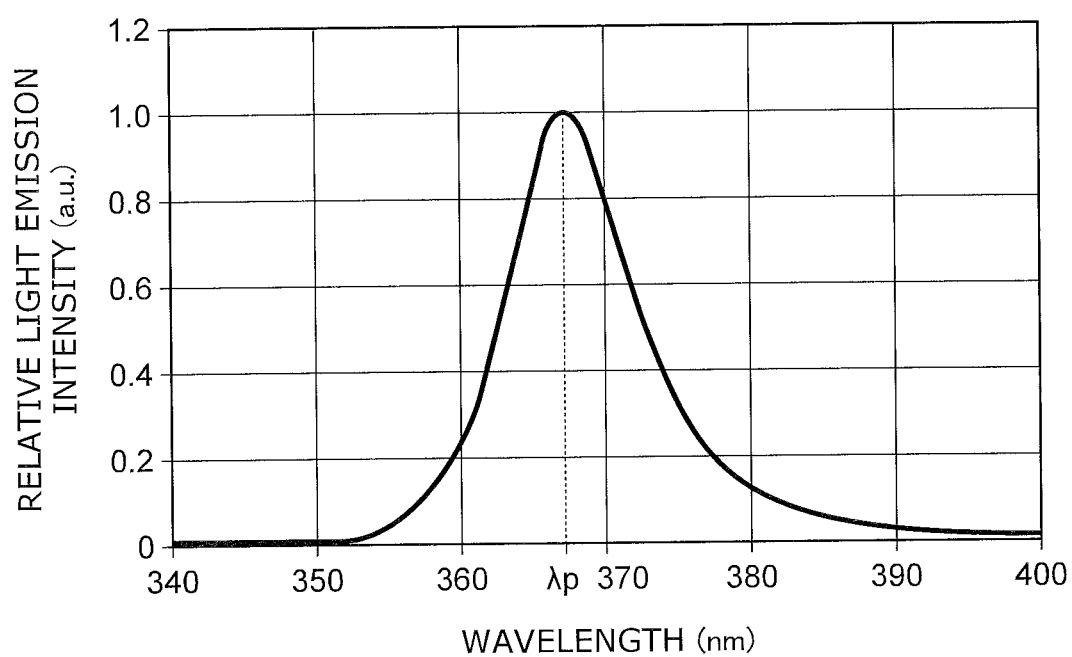
FIG. 17 is a graph showing an example of an intensity distribution of an ultraviolet ray emitted from an UVLED, in which the horizontal axis is wavelength, and the vertical axis is intensity.

FIG. 17 is a graph showing an example of the intensity distribution of the ultraviolet ray emitted from the UVLED, in which the horizontal axis is the wavelength, and the vertical axis is the intensity.

As shown in FIG. 16, in addition to the configuration of the ultraviolet irradiation device 4 according to the third embodiment, a spectrometer 27 is provided in the ultraviolet irradiation device 6 according to the embodiment. The spectrometer 27 measures the intensity of the ultraviolet ray for each wavelength. The spectrometer 27 is disposed at the irradiation position of the ultraviolet ray emitted from the UVLED 32, and is connected to the controller 17. A photodiode or an ultraviolet sensor may be provided instead of the spectrometer 27.

For example, the wavelength distribution shown in FIG. 17 is obtained by the spectrometer 27. The spectrometer 27 outputs the wavelength distribution to the controller 17. The controller 17 calculates the peak wavelength λp and the radiant flux φe from the wavelength distribution and utilizes this result in the feedback control of the peak wavelength λp and the radiant flux φe.

Thus, according to the embodiment, the precision of the peak wavelength λp and the radiant flux φe increases because the peak wavelength λp and the radiant flux φe can be directly measured and utilized in the feedback control.

Otherwise, the configuration, the operations, and the effects of the embodiment are similar to those of the third embodiment.

Although examples are described in the embodiments and the specific examples of the embodiments described above in which the ultraviolet irradiation device is applied to curing an ultraviolet-curing resin, the applications of the ultraviolet irradiation device are not limited thereto. For example, ultraviolet-curing ink may be cured in an inkjet printer or in screen printing. Also, an ultraviolet-curing adhesive of ultraviolet bonding may be cured. Utilization also is possible as an ultraviolet light source of an inspection apparatus. Banknote identification, the detection of scratches on metal surfaces, edge inspection, product inspection, etc., are examples of inspections. In other applications as well, the ultraviolet irradiation device according to the invention can be used favorably as a light source of an ultraviolet ray of which the peak wavelength is controlled.

For example, the invention can be utilized in a manufacturing apparatus of an integrated circuit device, etc.

Obviously, numerous modifications and variations of the present invention are possible in light of the above teachings. It is therefore to be understood that within the scope of the appended claims, the invention may be practiced otherwise than as specifically described herein.

What is claimed is:

1. An ultraviolet irradiation device comprising:
a light-emitting element configured to emit an ultraviolet light;
a temperature control element configured to control a temperature of the light-emitting element; and
a control circuit configured to send a control signal to a temperature control element controller to control the temperature control element based on a voltage of the light-emitting element provided via a voltage/current measurement circuit so as to control a peak wavelength of the ultraviolet light.

2. The ultraviolet irradiation device according to claim 1, wherein the control circuit is configured to estimate the temperature of the light-emitting element based on the voltage and controls the temperature control element based on a relationship between the temperature of the light-emitting element and the peak wavelength of the ultraviolet light to be emitted by the light-emitting element.

3. The ultraviolet irradiation device according to claim 1, wherein the control circuit is configured to control the temperature control element based on the voltage of the light-emitting element while the light-emitting element is emitting the ultraviolet light.

4. The ultraviolet irradiation device according to claim 1, wherein the control circuit is configured to control the light-emitting element to perform pulse irradiation of the ultraviolet light.

5. The ultraviolet irradiation device according to claim 4, wherein
a pulse width of the pulse irradiation is 10 milliseconds or less, and
a duty ratio of the pulse irradiation is 0.01 or less.

6. An ultraviolet irradiation device comprising:
light-emitting elements configured to emit ultraviolet lights having respective peak wavelengths, the respective peak wavelengths being different from each other;
a temperature control element configured to control temperatures of the light-emitting elements; and
a control circuit configured to send a control signal to a temperature control element controller to control the temperature control element to control one of the light-emitting elements to emit one of the ultraviolet lights and to control a peak wavelength of the one of the ultraviolet lights,
wherein the control circuit is configured to control the temperature control element based on a voltage of the light-emitting element provided via a voltage/current measurement circuit.

7. The device according to claim 6, wherein the respective peak wavelengths of the ultraviolet lights that are emittable by the light-emitting elements are not less than 365 nm and not more than 405 nm.

8. The device according to claim 6, wherein
the respective peak wavelengths of the ultraviolet lights are configured to be controlled within predetermined ranges, and
the predetermined ranges of at least two of the light-emitting elements partially overlap with each other.

9. The device according to claim 8, wherein a width in which the predetermined ranges of the at least two of the light-emitting elements overlap with each other is 5 nm or less.

10. The device according to claim 6, wherein the control circuit is configured to control the temperature control element based on a voltage of one of the light-emitting elements while the one of the light-emitting elements is emitting one of the ultraviolet lights.

11. The device according to claim 6, wherein the control circuit is configured to control one of the light-emitting elements to perform pulse irradiation of one of the ultraviolet lights.

12. The device according to claim 11, wherein
a pulse width of the pulse irradiation is 10 milliseconds or less, and
a duty ratio of the pulse irradiation is 0.01 or less.

13. A method for curing an ultraviolet-curing resin, comprising:
controlling a temperature control element provided on a light-emitting element to control a temperature of the light-emitting element such that a peak wavelength of an ultraviolet light to be emitted by the light-emitting element approaches a target peak wavelength of the ultraviolet light based on a relationship between the temperature of the light-emitting element and the peak wavelength of the ultraviolet light to be emitted by the light-emitting element; and
applying, to the light-emitting element, a constant current pulse having a pulse width of 10 milliseconds or less,
wherein the temperature control element is controlled based on a voltage of the light-emitting element provided via a voltage/current measurement circuit.

14. A method for curing an ultraviolet-curing resin, comprising:
controlling a temperature control element provided on a light-emitting element to control a temperature of the light-emitting element such that a peak wavelength of an ultraviolet light to be emitted by the light-emitting element approaches a target peak wavelength of the ultraviolet light based on a first relationship between the temperature of the light-emitting element and the peak wavelength of the ultraviolet light to be emitted by the light-emitting element, and applying a current to the light-emitting element based on a second relationship between radiant flux of the ultraviolet light and a current flowing in the light-emitting element such that the radiant flux of the ultraviolet light approaches the target radiant flux, wherein the temperature control element is controlled based on a voltage of the light-emitting element provided via a voltage/current measurement circuit.

* * * * *